US012556963B2

(12) United States Patent
Sun et al.

(10) Patent No.: US 12,556,963 B2
(45) Date of Patent: Feb. 17, 2026

(54) COMPUTING SERVICE IMPLEMENTATION METHOD AND APPARATUS

(71) Applicant: HUAWEI TECHNOLOGIES CO., LTD., Shenzhen (CN)

(72) Inventors: Fei Sun, Shanghai (CN); Haiyan Luo, Shenzhen (CN); Qinghai Zeng, Shanghai (CN); Jietao Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 534 days.

(21) Appl. No.: 18/147,164

(22) Filed: Dec. 28, 2022

(65) Prior Publication Data

US 2023/0139345 A1 May 4, 2023

Related U.S. Application Data

(63) Continuation of application No. PCT/CN2021/102759, filed on Jun. 28, 2021.

(30) Foreign Application Priority Data

Jun. 30, 2020 (CN) .......................... 202010624236.8

(51) Int. Cl.
*H04W 4/00* (2018.01)
*H04W 24/02* (2009.01)
*H04W 28/02* (2009.01)

(52) U.S. Cl.
CPC ....... *H04W 28/0268* (2013.01); *H04W 24/02* (2013.01)

(58) Field of Classification Search
CPC .......................... H04W 28/02; H04W 28/0268
See application file for complete search history.

(56) References Cited

U.S. PATENT DOCUMENTS

| 10,887,801 | B2 * | 1/2021 | Hong | ................ | H04W 36/0022 |
| 2012/0258733 | A1 * | 10/2012 | Fischer | ..................... | G01S 5/04 |
| | | | | | 455/456.1 |

(Continued)

FOREIGN PATENT DOCUMENTS

| CA | 3063020 A1 * | 12/2019 | ............ H04W 80/10 |
| CN | 106358245 A | 1/2017 | |

(Continued)

OTHER PUBLICATIONS

3GPP TS 23.222 V17.0.0, "3rd Generation Partnership Project; Technical Specification Group Services and System Aspects; Functional architecture and information flows to support Common API Framework for 3GPP Northbound APIs; Stage 2 (Release 17)", Mar. 2020, 113 pages.

(Continued)

*Primary Examiner* — Elisabeth Benoit Magloire
(74) *Attorney, Agent, or Firm* — Maier & Maier, PLLC

(57) ABSTRACT

A computing service implementation method and an apparatus. The method includes: a first radio access network (RAN) device obtains computing capability information of a first communication device; the first RAN device sends a first request to the first communication device, where the first request is for requesting the first communication device to perform a computing service of the first RAN device; the first RAN device receives a first response from the first communication device, where the first response indicates the computing service that is of the first RAN device and that is admitted by the first communication device; and the first RAN device exchanges, with the first communication device, data of the computing service that is of the first RAN device and that is admitted by the first communication device.

20 Claims, 12 Drawing Sheets

(56) References Cited

U.S. PATENT DOCUMENTS

| | | | |
|---|---|---|---|
| 2018/0192471 A1* | 7/2018 | Li | H04W 72/535 |
| 2019/0190789 A1* | 6/2019 | Zhang | G06F 9/5044 |
| 2019/0278631 A1 | 9/2019 | Guim Bernat et al. | |
| 2020/0137642 A1* | 4/2020 | Hong | H04W 36/0061 |
| 2020/0145876 A1* | 5/2020 | Dao | H04L 12/1407 |
| 2020/0252941 A1* | 8/2020 | Schmidt | H04B 7/185 |

FOREIGN PATENT DOCUMENTS

| | | | | |
|---|---|---|---|---|
| CN | 110087257 A | | 8/2019 | |
| CN | 110769038 A | | 2/2020 | |
| WO | WO-2019000275 A1 | * | 1/2019 | H04W 16/18 |

OTHER PUBLICATIONS

3GPP TS 23.501 V16.4.0, "3rd Generation Partnership Project; Technical Specification Group Services and System Aspects; System architecture for the 5G System (5GS); Stage 2(Release 16)", Mar. 2020, 430 pages.

3GPP TS 23.502 V16.4.0, "3rd Generation Partnership Project; Technical Specification Group Services and System Aspects; Procedures for the 5G System (5GS); Stage 2 (Release 16)", Mar. 2020, 582 pages.

3GPP TS 23.558 V0.3.0, "3rd Generation Partnership Project; Technical Specification Group Services and System Aspects; Architecture for enabling Edge Applications; (Release 17)", Jun. 2020, 70 pages.

3GPP TR 23.758 v17.0.0, "3rd Generation Partnership Project; Technical Specification Group Services and System Aspects; Study on application architecture for enabling Edge Applications; (Release 17)", Dec. 2019, 113 pages.

3GPP TS 29.122 V16.5.0, "3rd Generation Partnership Project; Technical Specification Group Core Network and Terminals; T8 reference point for Northbound APIs; (Release 16)", Mar. 2020, 345 pages.

3GPP TS 29.522 V16.3.0, "3rd Generation Partnership Project; Technical Specification Group Core Network and Terminals; 5G System; Network Exposure Function Northbound APIs; Stage 3 (Release 16)", Mar. 2020, 150 pages.

* cited by examiner

COMPUTING SERVICE IMPLEMENTATION METHOD AND APPARATUS

CROSS-REFERENCE TO RELATED APPLICATIONS

This application is a continuation of International Application No. PCT/CN2021/102759, filed on Jun. 28, 2021, which claims priority to Chinese Patent Application No. 202010624236.8, filed on Jun. 30, 2020. The disclosures of the aforementioned applications are hereby incorporated by reference in their entireties.

TECHNICAL FIELD

The embodiments relate to the wireless communications field, a computing service method, and an apparatus.

BACKGROUND

With rapid development of wireless communication technologies, a 5th generation (5G) wireless communication technology has become a popular subject in the industry currently. 5G supports a variety of application requirements, including support of an access capability characterized by higher-rate experience and higher bandwidth, information exchange characterized by a lower latency and high reliability, access and management of larger-scale and low-cost machine-type communication devices, and the like. Access of a large quantity of terminals, service bearing required by differentiated quality of service (QoS), ultra-large bandwidth management, multi-antenna deployment, and the like make processing of a radio access network (RAN) device extremely complex. The RAN device needs to dynamically perform self-optimization based on a rapidly changing network status to ensure network performance and user experience. Computing resource overheads required by the RAN device to perform self-optimization are high. How to effectively implement a self-optimization requirement of the RAN device by using a network resource is a problem that urgently needs to be resolved currently.

SUMMARY

The embodiments may provide a computing service implementation method, to effectively use a network resource to implement self-optimization of a RAN device.

The following describes the embodiments a plurality of aspects. It is easy to understand that implementations of the plurality of aspects may be mutually referenced.

According to a first aspect, the embodiments may provide a computing service implementation method. The method includes: A first radio access network RAN device obtains computing capability information of a first communication device; the first RAN device sends a first request to the first communication device, where the first request is for requesting the first communication device to perform a computing service of the first RAN device; the first RAN device receives a first response from the first communication device, where the first response indicates the computing service that is of the first RAN device and that is admitted by the first communication device; and the first RAN device exchanges, with the first communication device, data of the computing service that is of the first RAN device and that is admitted by the first communication device.

It can be understood that according to the method provided in this embodiment, the first RAN device implements the computing service of the first RAN device via the first communication device, and a problem that the first RAN device cannot complete the computing service is resolved.

In a possible implementation, the computing capability information of the first communication device includes a type of a computing service supported by the first communication device and available resource information.

In a possible implementation, the computing capability information of the first communication device includes a service support list and an available resource list.

In a possible implementation, the computing capability information of the first communication device further includes at least one of the following parameters: a service area, service continuity support, an availability schedule, or an availability reporting period.

In a possible implementation, the first request includes a quality of service QoS requirement of the computing service of the first RAN device, and the first response includes at least one computing service flow that is of the first RAN device and that is admitted by the first communication device.

In a possible implementation, the first request includes a requested computing service flow list and a corresponding requested resource list.

In a possible implementation, the first request includes at least one requested computing service flow and information about resources required by each service flow in the at least one computing service flow.

In a possible implementation, the first request further includes a service continuity guarantee indication, a requested key performance indicator, and transport layer information.

In a possible implementation, that a first RAN device obtains computing capability information of a first communication device includes: The first RAN device sends a second request to the first communication device, where the second request is for requesting to obtain the computing capability information of the first communication device, and the first RAN device receives the computing capability information of the first communication device from the first communication device; or the first RAN device sends a second request to a second communication device, where the second request is for requesting to obtain the computing capability information of the first communication device, and the first RAN device receives the computing capability information of the first communication device from the second communication device.

It can be understood that the first RAN device obtains the computing capability information of the first communication device by requesting, so that the first RAN device determines whether the first communication device can provide a computing service for the first RAN device.

In a possible implementation, that a first RAN device obtains computing capability information of a first communication device includes: The first RAN device receives the computing capability information of the first communication device from the first communication device, and the first RAN device sends acknowledgment information to the first communication device, where the acknowledgment information indicates that the first RAN device correctly receives the computing capability information of the first communication device; or the first RAN device receives the computing capability information of the first communication device from a second communication device, and the first RAN device sends acknowledgment information to the second communication device, where the acknowledgment information indicates that the first RAN device correctly receives the computing capability information of the first communication device.

The first RAN device may directly obtain the computing capability information of the first communication device, so that the first RAN device determines whether the first communication device can provide a computing service for the first RAN device.

In a possible implementation, the first communication device is a second RAN device, and the second communication device is a core network CN device; or the first communication device is a terminal device, and the second communication device is a second RAN device or a CN device.

In a possible implementation, that the first RAN device sends a first request to the first communication device includes: When the first communication device is the second RAN device or the terminal device, the first RAN device determines, based on the computing capability information of the first communication device, that the first communication device is a target communication device, and the first RAN device sends the first request to the target communication device; or when the first communication device is the second RAN device and the second communication device is the CN device, the first RAN device determines, based on the computing capability information of the first communication device, that the first communication device is a target communication device, and the first RAN device sends the first request to the target communication device via the second communication device.

According to a second aspect, the embodiments may provide a computing service implementation method. The method includes: A first communication device receives a first request from a second communication device, where the first request is for requesting the first communication device to perform a computing service of a first RAN device; the first communication device sends a first response to the second communication device, where the first response indicates the computing service that is of the first RAN device and that is admitted by the first communication device; and the first communication device exchanges, with the first RAN device, data of the computing service that is of the first RAN device and that is admitted by the first communication device.

According to the method provided in this embodiment, the first communication device may provide the computing service for the first RAN device, and a problem that the first RAN device cannot complete the computing service may be resolved.

In a possible implementation, before the first communication device receives the first request from the second communication device, the method further includes: The first communication device generates computing capability information of the first communication device; and the first communication device sends the computing capability information of the first communication device to the second communication device.

The first communication device may send the computing capability information of the first communication device by responding to the request, so that the first RAN device determines whether the first communication device can provide a computing service for the first RAN device.

In a possible implementation, the first request includes a quality of service QoS requirement of the computing service of the first RAN device, and the first response includes at least one computing service flow that is of the first RAN device and that is admitted by the first communication device.

In a possible implementation, the first request includes a requested computing service flow list and a corresponding requested resource list.

In a possible implementation, the first request includes at least one requested computing service flow and information about resources required by each service flow in the at least one computing service flow.

In a possible implementation, the first request further includes a service continuity guarantee indication, a requested key performance indicator, and transport layer information.

In a possible implementation, the computing capability information of the first communication device includes a type of a computing service supported by the first communication device and available resource information.

In a possible implementation, the computing capability information of the first communication device includes a service support list and an available resource list.

In a possible implementation, the computing capability information of the first communication device further includes at least one of the following parameters: a service area, service continuity support, an availability schedule, or an availability reporting period.

In a possible implementation, before the first communication device sends the first response to the second communication device, the method further includes: The first communication device performs admission control, where the admission control is for determining the computing service that is of the first RAN device and that is admitted by the first communication device.

The first communication device may determine an admitted computing service of the first RAN device by admission control. This ensures QoS of the computing service provided by the first communication device.

In a possible implementation, the first communication device is a second RAN device, and the second communication device is the first RAN device or a CN device; or the first communication device is a terminal device, and the second communication device is the first RAN device.

In a possible implementation, when the first communication device is the second RAN device and the second communication device is the first RAN device or the CN device, and before the first communication device receives the first request from the second communication device, the method further includes: The second RAN device generates computing capability information of the second RAN device; and the second RAN device sends the computing capability information of the second RAN device to the second communication device.

In a possible implementation, when the first communication device is the terminal device and the second communication device is the first RAN device, and before the first communication device receives the first request from the second communication device, the method further includes: The terminal device generates computing capability information of the terminal device, and the terminal device sends the computing capability information of the terminal device to the first RAN device; or the terminal device generates computing capability information of the terminal device, and the terminal device sends the computing capability information of the terminal device to the first RAN device via a CN device.

According to a third aspect, the embodiments may provide a computing service implementation method. The method includes: A first communication device generates computing capability information of the first communication device, and the first communication device sends the computing capability information to a second communication device.

According to the method provided in this embodiment, the first communication device may report the computing capability information of the first communication device to another communication device, so that the another communication device determines whether the first communication device can provide a computing service, and the another communication device uses the first communication device to provide a computing service of the another communication device.

In a possible implementation, the computing capability information of the first communication device includes a type of a computing service supported by the first communication device and available resource information.

In a possible implementation, the first communication device is a first RAN device, and the second communication device is a second RAN device or a CN device; or the first communication device is a terminal device, and the second communication device is a first RAN device or a CN device.

In a possible implementation, before the first communication device sends the computing capability information to the second communication device, the first communication device receives a first request of the second communication device. The first request is for requesting the first communication device to send the computing capability information of the first communication device.

In a possible implementation, after the first communication device sends the computing capability information to the second communication device, the first communication device receives acknowledgment information of the second communication device. The acknowledgment information indicates that the second communication device correctly receives the computing capability information sent by the first communication device.

According to a fourth aspect, the embodiments may provide a computing service implementation method. The method includes: A second communication device receives computing capability information from a first communication device, and the second communication device stores the computing capability information of the first communication device. The computing capability information of the first communication device includes a type of a computing service supported by the first communication device and available resource information.

According to the method provided in this embodiment, the second communication device obtains the computing capability information of the first communication device, so that the second communication device can determine whether the first communication device can provide a computing service, and the second communication device uses the first communication device to provide a computing service of another communication device.

In a possible implementation, the first communication device is a first RAN device, and the second communication device is a second RAN device or a CN device; or the first communication device is a terminal device, and the second communication device is a first RAN device or a CN device.

In a possible implementation, before the second communication device receives the computing capability information from the first communication device, the second communication device sends a first request to the first communication device. The first request is for requesting the first communication device to send the computing capability information of the first communication device.

In a possible implementation, after the second communication device receives the computing capability information from the first communication device, the second communication device sends acknowledgment information to the first communication device. The acknowledgment information indicates that the second communication device correctly receives the computing capability information sent by the first communication device.

According to a fifth aspect, the embodiments may provide a computing service implementation method. The method includes: A serving radio access network RAN device determines to transfer a computing service; the serving RAN device sends a transfer request to a target terminal device, where the transfer request indicates that the serving RAN device requests the target terminal device to undertake all or some computing services of a source terminal device; the serving RAN device receives a transfer response from the target terminal device, where the transfer response indicates a computing service flow that is of the source terminal device and that is admitted by the target terminal device; the serving RAN device sends configuration information to the target terminal device; and the serving RAN device exchanges, with the target terminal device, data of the computing service flow.

According to the method provided in this embodiment, the RAN device transfers a computing service between terminal devices, to ensure continuity of the computing service.

In a possible implementation, before the serving RAN device exchanges, with the target terminal device, the data of the computing service flow, the method further includes: The serving RAN device performs intermediate computing service data and context transfer interaction with the source terminal device.

According to a sixth aspect, a communication device is provided. The communication device is configured to perform the method according to any one of the first aspect or the possible implementations of the first aspect, the method according to any one of the second aspect or the possible implementations of the second aspect, the method according to any one of the third aspect or the possible implementations of the third aspect, the method according to any one of the fourth aspect or the possible implementations of the fourth aspect, or the method according to any one of the fifth aspect or the possible implementations of the fifth aspect. The communication device may include units configured to perform the method according to any one of the first aspect or the possible implementations of the first aspect, any one of the second aspect or the possible implementations of the second aspect, any one of the third aspect or the possible implementations of the third aspect, any one of the fourth aspect or the possible implementations of the fourth aspect, or any one of the fifth aspect or the possible implementations of the fifth aspect.

According to a seventh aspect, a computer program product is provided. The computer program product includes computer program code. When the computer program code is run by a communication unit and a processing unit or a transceiver and a processor of a communication device (for example, a radio access network device or a positioning device), the communication device is enabled to perform the method according to any one of the first aspect or the possible implementations of the first aspect, any one of the second aspect or the possible implementations of the second aspect, any one of the third aspect or the possible implementations of the third aspect, any one of the fourth aspect or the possible implementations of the fourth aspect, or any one of the fifth aspect or the possible implementations of the fifth aspect.

According to an eighth aspect, a non-transitory computer-readable storage medium is provided. The non-transitory computer-readable storage medium stores a program. The program enables a computer to perform the method according to any one of the first aspect or the possible implementations of the first aspect, any one of the second aspect or the possible implementations of the second aspect, any one of the third aspect or the possible implementations of the third aspect, any one of the fourth aspect or the possible implementations of the fourth aspect, or any one of the fifth aspect or the possible implementations of the fifth aspect.

According to a ninth aspect, an embodiment may provide a chip. The chip is coupled to a memory, and performs the method according to the first aspect, the second aspect, the third aspect, the fourth aspect, or the fifth aspect.

These aspects or other aspects are more concise and more intelligible in descriptions in the following embodiments.

BRIEF DESCRIPTION OF THE DRAWINGS

The following briefly describes the accompanying drawings used in embodiments or a conventional technology.

DETAILED DESCRIPTION OF THE EMBODIMENTS

The following describes the embodiments with reference to the accompanying drawings.

The word "example" is used to represent "giving an example, an illustration, or a description". Any embodiment described as an "example" should not be explained as being more preferred or having more advantages than another embodiment. For the purpose that any person skilled in the art can implement and use the embodiments, the following descriptions are provided. In the following descriptions, details are listed for the purpose of explanation. A person of ordinary skill in the art may understand that the embodiments be implemented without using these details. In other instances, well-known structures and processes are not described in detail, to avoid obscuring the descriptions with unnecessary details. Therefore, the embodiments may extend to the widest scope that complies with the principles and features.

In the embodiments and accompanying drawings, the terms "first", "second", "third", "fourth", and the like (if existent) are intended to distinguish between similar objects but do not necessarily indicate an order or sequence. It should be understood that the data termed in such a way are interchangeable in proper circumstances so that the embodiments described herein can be implemented in other orders than the order illustrated or described herein. In addition, the terms "include," "have," and any other variants are intended to cover the non-exclusive inclusion. For example, a process, method, system, product, or device that includes a list of operations or units is not necessarily limited to those expressly listed operations or units but may include other operations or units not expressly listed or inherent to such a process, method, product, or device.

The terms "system" and "network" may be used interchangeably.

The following embodiments may be combined with each other, and a same or similar concept or process may not be described repeatedly in some embodiments.

Figure 1:
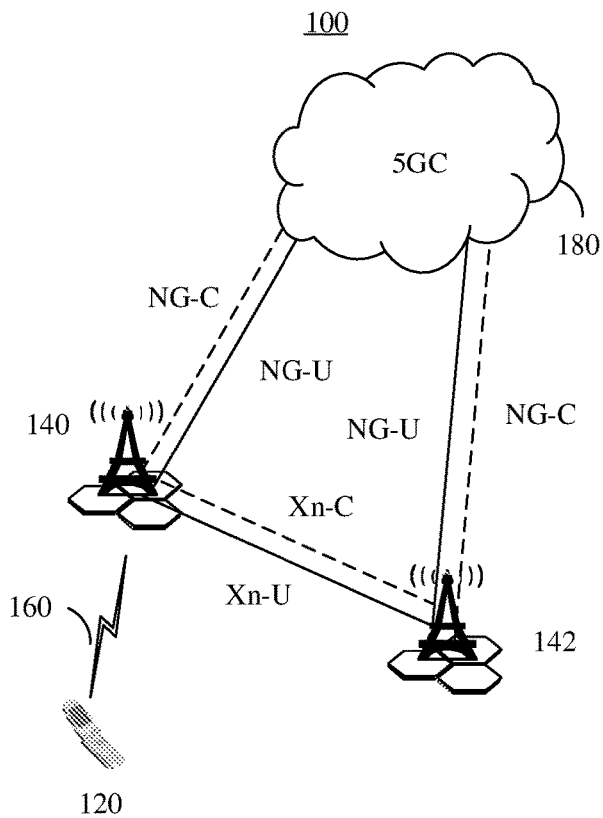
FIG. 1 is a schematic diagram of a communication system according to an embodiment.

The following describes the embodiments with reference to accompanying drawings. FIG. 1 is a schematic diagram of a communication system to which an embodiment is applied. It should be understood that the embodiments may be applied to various communication systems, for example, a long term evolution (LTE) system, an LTE frequency division duplex (FDD) system, an LTE time division duplex (TDD) system, a code division multiple access (CDMA) system, a universal mobile telecommunications system (UMTS), a wireless local area network (WLAN), a 5th generation (5G) mobile communication system, a new radio (NR) communication system, a communication system based on an orthogonal frequency division multiplexing (OFDM) technology, or a next generation (NG) communication system, for example, 6G. The embodiments may be described by using a 5G system as an example, but is not limited to the 5G system. A person of ordinary skill in the art may understand that, as a new service scenario emerges and a network architecture evolves, the embodiments are also applicable.

The communication system 100 shown in FIG. 1 includes a terminal device 120, a radio access network (RAN), and a 5G core network (5GC) 180. The RAN includes a RAN device 140 and a RAN device 142. It should be understood that FIG. 1 merely schematically describes one communication system. In an actual system, the RAN may include more RAN devices, and a plurality of terminal devices are separately connected to the core network (CN) via serving RAN devices of the terminal devices. In FIG. 1, the terminal device 120 performs wireless communication with the RAN device 140 through a radio link 160. Optionally, the terminal device 120 may also wirelessly connect to the RAN device 142 at the same time to implement multi-connection communication. The RAN devices 140/142 may be connected to the 5GC 180 through a control plane interface NG-C and a user plane interface NG-U respectively. The RAN devices may be connected to each other through a control plane interface Xn-C and a user plane interface Xn-U. The NG-C and the NG-U are combined as an NG interface. The Xn-C and the Xn-U are combined as an Xn interface. The 5GC includes different types of core network devices. For example, the RAN devices 140/142 are connected to an access and mobility management function (AMF) node in the 5GC 180 through the NG-C interface. The RAN devices 140/142 are connected to a user plane function (UPF) node in the 5GC 180 through the NG-U interface. The core network device may include a session management function (SMF), an access and mobility management function (AMF), a network data analytics function (NWDAF), a user plane function (UPF), and the like. The SMF is responsible for session management (for example, session establishment, session modification, and session release), IP address allocation and management of UE, selection and control of a user plane function, termination of a session management part in a non-access stratum (NAS) message, and the like. The AMF is responsible for access control, mobility management, attach and detach, gateway selection, and the like. The NWDAF is responsible for data collection and analysis, and the like. The UPF is responsible for packet routing and forwarding, and the like.

In the embodiments, the RAN device is an apparatus deployed in a radio access network to provide a wireless communication function for the terminal device. The RAN device may include various forms. For example, the RAN device may be a next-generation base station, for example, a next-generation NodeB (gNB) or a next-generation evolved NodeB (ng-eNB), or may be an access point AP) in a wireless local area network (WLAN), an evolved NodeB (eNB) in LTE, a relay station or an access point, a vehicle-mounted device and a wearable device, or the like. One RAN device has one or more transmission reception points (TRPs). It should be understood that the terminal device communicates with the RAN device by using a transmission resource (for example, a frequency domain resource, a time domain resource, or a code domain resource) used in one or more cells managed by the network device. The cell may be a macro cell, a hyper cell, or a small cell. The small cell herein may include a metro cell, a micro cell, a pico cell, a femto cell, or the like. These small cells are characterized by small coverage and low transmit power and are applicable to providing a high-rate data transmission service.

The terminal device shown in FIG. 1 may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device may be a station (ST) in a WLAN, a cellular phone, a cordless phone, a SIP phone, a wireless local loop (WLL) station, a personal digital assistant (PDA) device, a tablet computer (pad), a handheld device or computer with a wireless communication function, a relay device, a computing device or another processing device coupled to a wireless modem, a vehicle-mounted device, a wearable device, a terminal device in a next-generation communication system, for example, a terminal device in a 5G network or a terminal device in a future evolved public land mobile network (PLMN), or the like. By way of example but not limitation, in the embodiments, the terminal device may alternatively be a virtual reality (VR) terminal device, an augmented reality (AR) terminal device, a wireless terminal device in industrial control, a wireless terminal device in self driving, a wireless terminal device in telemedicine, a wireless terminal device in a smart grid, a wireless terminal device in transportation safety, a wireless terminal device in a smart city, a wireless terminal device in a smart home, a navigation apparatus, an internet of things (IoT) apparatus, or a wearable device. The wearable device may also be referred to as a wearable intelligent device and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement all or some functions without depending on smartphones, such as smart watches or smart glasses, and devices that focus on only one type of application function and need to work with other devices such as smartphones, such as various smart bands or smart jewelry for monitoring physical signs.

Figure 2:
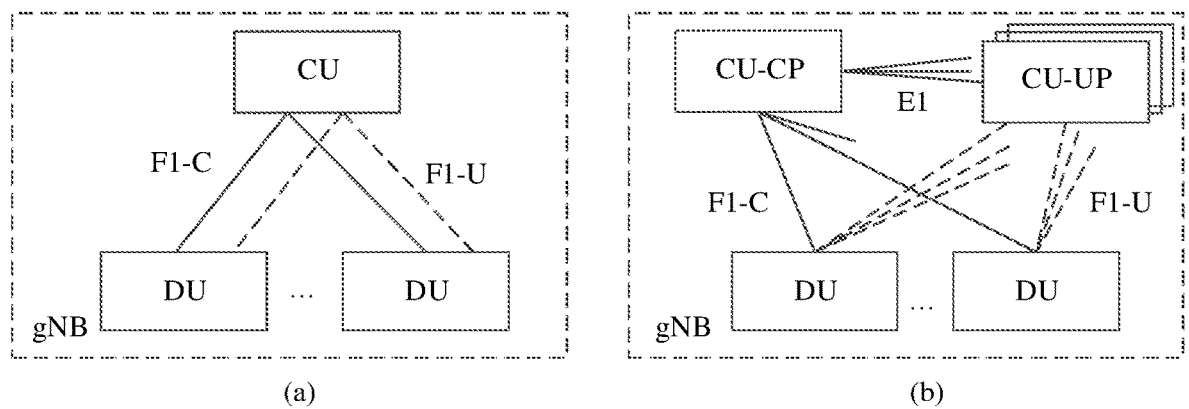
FIG. 2 is a schematic diagram of an architecture of a gNB divided into a CU and a DU according to an embodiment.

Optionally, in a 5G system, a RAN device (for example, a gNB) may be further divided into a central unit (CU) and a distributed unit (DU) based on a protocol stack. The CU and the DU may be separately deployed on different physical devices. The CU is responsible for operations of an RRC layer, an SDAP layer, and a PDCP layer, and the DU is responsible for operations of an RLC layer, a MAC layer, and a PHY layer. FIG. 2(a) shows an architecture of a gNB divided into a CU and a DU. One gNB may include one CU and one or more DUs, and the one or more DUs are controlled by the CU. One DU is connected to the CU through a control plane interface (for example, F1-C), to transmit control plane data. One DU is connected to the CU through a user plane interface (for example, F1-U), to transmit user plane data. Further, the CU may be classified into a central unit-control plane (namely, a central unit-control plane CU-CP network element) and a central unit-user plane (namely, a central unit-user plane CU-UP network element). The CU-CP and the CU-UP may also be separately deployed on different physical devices, the CU-CP is responsible for control plane processing at the RRC layer and the PDCP layer, and the CU-UP is responsible for user plane processing at the SDAP layer and the PDCP layer. FIG. 2(b) shows an architecture of a gNB divided into a CU-CP, a CU-UP, and a DU. One gNB may include one CU-CP, one or more CU-UPs, and one or more DUs. One CP-UP is connected to only one CU-CP through a control plane interface (for example, E1), to transmit control plane data. One DU is connected to only one CU-CP through a control plane interface (for example, F1-C), to transmit control plane data. Under control of the CU-CP, one DU may be connected to one or more CU-UPs, one CU-UP may also be connected to one or more DUs, and the CU-UP is connected to the DU through a user plane interface (for example, F1-U), to transmit user plane data. It should be noted that, to maintain network elasticity, one DU or one CU-UP may alternatively be connected to a plurality of CU-CPs. In this case, the plurality of CU-CPs may serve as backups for each other. During actual application, only one CU-CP runs at a moment. It should be understood that, for an architecture of the RAN device divided into the CU and the DU, the foregoing protocol stack division manner in which the RAN device is divided into the CU and the DU is merely an example, and the RAN device may alternatively be divided into the CU and the DU in another division manner. For example, the CU may be responsible for operations of the RRC layer, the SDAP layer, the PDCP layer, and the RLC layer, and the DU is responsible for operations of a MAC layer and a PHY layer. Alternatively, the CU is responsible for operations of the RRC layer and the SDAP layer, and the DU is responsible for operations of the PDCP layer, the RLC layer, a MAC layer, and a PHY layer. Similarly, the protocol stack division manner in which the CU is divided into the CU-CP and the CU-UP is also changeable. This is not limited.

For example, the communication system provided in the embodiments may use a 5G technology. Due to service diversity and configuration flexibility, a 5G RAN has high processing complexity. For example, the 5G RAN needs to support different physical layer parameters, ultra-large bandwidth (>200 MHz), ultra-low latency services (such as self driving and wireless healthcare), ultra-high-speed services (such as virtual reality and augmented reality), deployment of large-scale antenna arrays, and the like. Therefore, in a running process, the RAN device needs to have a self-optimization capability, and dynamically optimizes a configuration of the RAN device and a configuration for the terminal device based on a service status and a network status, to ensure network performance and user experience. The RAN device performs self-optimization processing by computing various data collected by the RAN device, for example, establishing a data model to compute an optimization result. This process is also referred to as a computing service of the RAN device. It has become understood that, because different RAN devices have different hardware capabilities, different resource configurations, and different current resource usage, there is a RAN device that does not have a resource or a capability for executing a computing service. As a result, the RAN device cannot implement self-optimization to ensure network performance and user experience. Therefore, the embodiments may implement a computing service of a RAN device. One RAN device may complete a computing service of the RAN device by using another RAN device or a terminal device that has a proper computing capability. Further, the embodiments may be further applied to an architecture of a RAN device having a CU and a DU. The CU may further include a CU-CP and a CU-UP that are separated from each other.

First, two terms are defined as follows.

(1) Device computing capability information indicates a computing capability that the device can provide for a computing service in a current status. The device computing capability information includes a type of the computing service supported by the device and available resource information. Optionally, the type of the supported computing service is represented by a service support list, and the available resource information is represented by an available resource list. The service support list indicates a type of a computing service supported by the device. Usually, one device may support one or more different types of computing services, for example, a supported artificial intelligence (AI) model type or a supported microservice type. The available resource list indicates one or more resources that are currently available to the device, for example, a graphics processing unit (GPU) resource, a central processing unit (CPU) resource, or a storage resource. Further, the available resource list may indicate availability degrees of various resources. For example, a RAN device may provide 20% of GPU resources for a computing service, 50% of storage resources for a computing service, 30% of CPU usage for a computing service, 2 GB of storage resources for a computing service, or the like.

Optionally, the device computing capability information further includes at least one of the following parameters: a service area, service continuity support, an availability schedule, or an availability reporting period. The service area indicates an area range in which the device can provide a computing service. For example, the area range may be a tracking area (TA) in a network, a tracking area list (TAL) including a plurality of tracking areas, a registration area (RA), or the like. The service continuity support indicates whether the device supports continuity of a computing service, for example, whether the device can continue to process a subsequent process of the computing service at a breakpoint after the computing service is interrupted. The availability schedule indicates a schedule in which the device can be used for a computing service, for example, a time window in which a computing service is provided. The availability reporting period indicates a period in which the device reports the computing capability information. Usually, in addition to providing the computing service, the device further needs to perform other communication connection and data processing. Therefore, an available computing capability of the device dynamically changes. In addition, in a process in which the device performs the computing service, because processing statuses of processes are different, the available computing capability of the device also dynamically changes. Because of a dynamic feature of the available computing capability of the device, the device usually needs to periodically report the computing capability information of the device.

For one RAN device, device computing capability information of the RAN device may be referred to as RAN device computing capability information and may also be referred to as a RAN device computing capability profile.

For one terminal device, device computing capability information of the terminal device may be referred to as terminal device computing capability information and may also be referred to as a terminal device computing capability profile.

(2) A quality of service (QoS) requirement of a computing service includes a type of a requested computing service and information about a resource required by the computing service of the type. Optionally, the type of the requested computing service is represented by a requested computing service flow list, and the information about the required resource is represented by a requested resource list. One type of computing service corresponds to one computing service flow, and information about resources required by the type of computing service may be represented as a list of resources required by the computing service flow corresponding to the type, for example, a GPU resource, a CPU resource, and a storage resource that are required. Quantities of various required resources may also be included.

Optionally, the QoS requirement of the computing service further includes a service continuity guarantee indication, a requested key performance indicator (KPI), transport layer information, and the like. The service continuity guarantee indication indicates whether a service continuity guarantee needs to be provided, when the service is interrupted, whether a subsequent process needs to be continued from a breakpoint, or processing of the service needs to be restarted. The requested KPI indicates a KPI required by the service, for example, a delay indicator. The transport layer information identifies tunnel transport layer information of a device that proposes the QoS requirement of the computing service, for example, an IP address and/or a tunnel endpoint address identifier (TEID).

This following several embodiments are provided. The following describes in detail the method embodiments with reference to FIG. 3 to FIG. 12. The following several embodiments may be combined with each other, and a same or similar concept or process may not be described repeatedly in some embodiments. It should be noted that FIG. 3 to FIG. 12 are schematic flowcharts of the method embodiments, and show detailed communication operations or operations of methods. However, these operations or operations are merely examples. Other operations or variations of various operations in FIG. 3 to FIG. 12 may be further performed in the embodiments. In addition, the operations in FIG. 3 to FIG. 12 may be separately performed in orders different from those presented in FIG. 3 to FIG. 12, and it is possible that not all the operations in FIG. 3 to FIG. 12 need to be performed.

Figure 3:
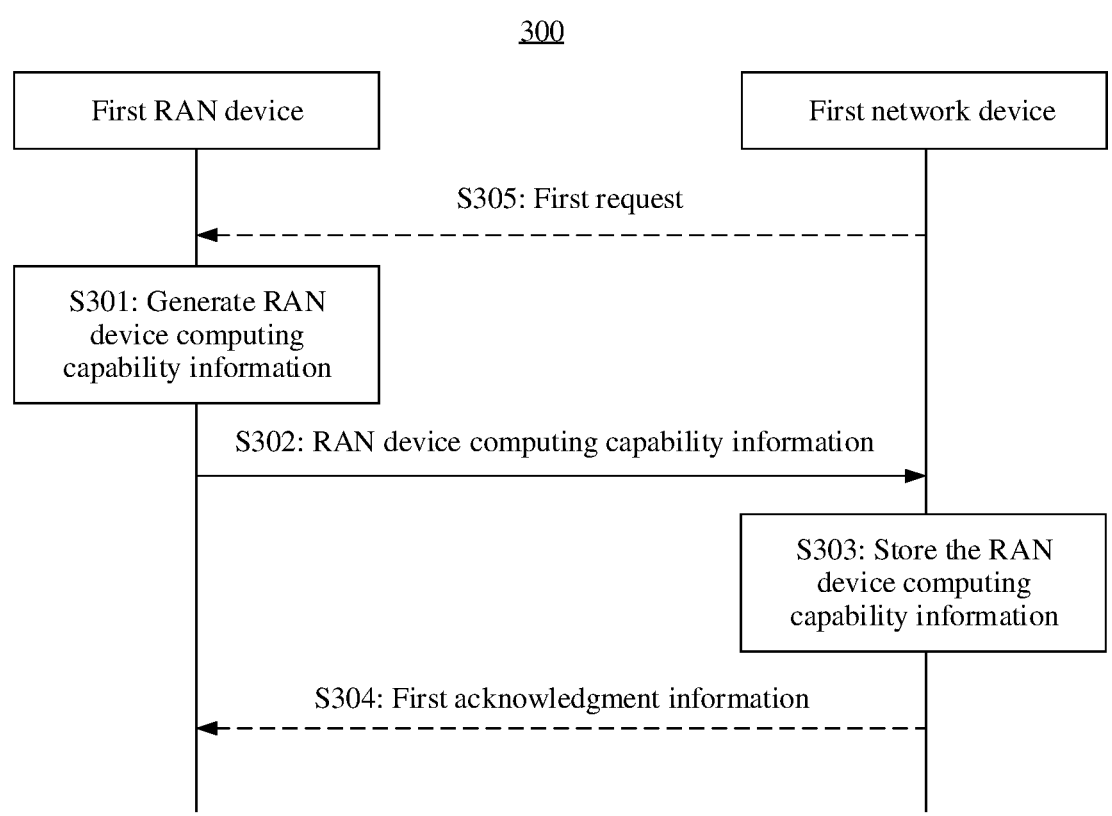
FIG. 3 is a schematic flowchart of a method for reporting a computing capability of a RAN device according to an embodiment.

FIG. 3 is a schematic flowchart of a method for reporting a computing capability of a RAN device according to an embodiment. The method 300 is applied to interaction between a RAN device and another network device. A procedure in FIG. 3 includes the following operations.

S301: A first RAN device generates RAN device computing capability information.

In this operation, the first RAN device generates the RAN device computing capability information of the first RAN device based on a current resource status and/or a policy of the first RAN device. It should be understood that because resource usage statuses of the RAN device are different at different moments, the RAN device computing capability information dynamically changes.

S302: The first RAN device sends the RAN device computing capability information of the first RAN device to a first network device. Correspondingly, the first network device receives the RAN device computing capability information from the first RAN device.

Usually, the first RAN device may periodically send the RAN device computing capability information to the first network device. Alternatively, the RAN device computing capability information may be sent to the first network device in a form of event triggering, for example, when an available resource of the first RAN device reaches a preset threshold, or when the first RAN device receives a computing capability information request from another network device.

The first RAN device may send the RAN device computing capability information in a plurality of forms. In one form, the first RAN device sends complete RAN device computing capability information, where the complete RAN device computing capability information includes parameters in current RAN device computing capability information of the first RAN device and values of the parameters. In another form, the first RAN device sends a part of the RAN device computing capability information, where the part of the RAN device computing capability information includes a part of parameters in current RAN device computing capability information of the first RAN device and a value of the part of parameters. For example, the first RAN device may send, in current sending, a parameter that is changed from that in RAN device computing capability information that is sent last time and a value of the parameter, a value change amount of the changed parameter, or the like. A form in which the first RAN device sends the RAN device computing capability information is not limited.

In a possible implementation, the first network device is a CN device, for example, an AMF. In this case, the first RAN device sends the RAN device computing capability information of the first RAN device to the CN device in a procedure of setting up an NG interface with the CN device or in a RAN device configuration update procedure. For example, the first RAN device includes the RAN device computing capability information in an NG setup request message, or the first RAN device includes the RAN device computing capability information in a RAN configuration update message. It should be understood that the first RAN device may further send the RAN device computing capability information to the CN device in another procedure of interacting with the CN device. Alternatively, the first RAN device may include the RAN device computing capability information in another existing message or a newly defined message of the NG interface. This is not limited.

In another possible implementation, the first network device is a second RAN device. In this case, the first RAN device sends the RAN device computing capability information of the first RAN device to the second RAN device in a procedure of setting up an Xn interface with the second RAN device or in an Xn interface configuration update procedure. For example, the first RAN device includes the RAN device computing capability information in an Xn setup request message, or the first RAN device includes the RAN device computing capability information in an NG-RAN node configuration update message. It should be understood that the first RAN device may further send the RAN device computing capability information to the second RAN device in another procedure of interacting with the second RAN device. Alternatively, the first RAN device may include the RAN device computing capability information in another existing message or a newly defined message of the Xn interface. This is not limited.

S303: The first network device stores the RAN device computing capability information of the first RAN device.

In this operation, after receiving the RAN device computing capability information from the first RAN device, the first network device stores the RAN device computing capability information.

Optionally, when the first network device periodically receives the RAN device computing capability information sent by the first RAN device, the first network device also periodically stores the latest received RAN device computing capability information. When the first network device aperiodically receives the RAN device computing capability information sent by the first RAN device, each time the first network device newly receives the RAN device computing capability information, the first network device stores the latest received RAN device computing capability information.

When the first network device receives complete RAN device computing capability information, the first network device directly stores the received RAN device computing capability information. When the first network device receives a part of the RAN device computing capability information, the first network device updates stored RAN device computing capability information based on the received part of the RAN device computing capability information, to store new complete RAN device computing capability information.

S304: The first network device sends first acknowledgment information to the first RAN device. Correspondingly, the first RAN device receives the first acknowledgment information from the first network device. The first acknowledgment information is for confirming that the first network device correctly receives the RAN device computing capability information sent by the first RAN device.

It should be understood that operation S304 is optional.

In a possible implementation, the first network device is a CN device, for example, an AMF. In this case, if the first RAN device includes the RAN device computing capability information in the NG setup request message in operation S301, in this operation, the CN device includes the first acknowledgment information in an NG setup response message. If the first RAN device includes the RAN device computing capability information in the RAN configuration update message in operation S301, in this operation, the CN device includes the first acknowledgment information in a RAN configuration update acknowledgment message. It should be understood that the CN device may further include the first acknowledgment information in another existing message or a newly defined message of an NG interface. This is not limited.

In another possible implementation, the first network device is a second RAN device. In this case, if the first RAN device includes the RAN device computing capability information in the Xn setup request message in operation S301, in this operation, the second RAN device includes the first acknowledgment information in an Xn Setup Response message. If the first RAN device includes the RAN device computing capability information in the NG-RAN node configuration update message in operation S301, in this operation, the second RAN device includes the first acknowledgment information in an NG-RAN node configuration update acknowledgment message. It should be understood that the second RAN device may further include the first acknowledgment information in another existing message or a newly defined message of an Xn interface. This is not limited.

Optionally, this embodiment further includes operation S305.

S305: The first network device sends a first request to the first RAN device. Correspondingly, the first RAN device receives the first request from the first network device. The first request is for requesting the first RAN device to report the RAN device computing capability information.

Optionally, the first network device requests the first RAN device to periodically report the RAN device computing capability information. In this case, the first request further includes information about a period in which the first RAN device reports the RAN device computing capability information and that is configured by the first network device.

Optionally, operation S304 is not included when operation S305 is included in this embodiment, or operation S305 is not included when operation S304 is included.

It should be noted that, when the first RAN device is in a CU-DU split architecture, the operations performed by the first RAN device in the foregoing operations in this embodiment are performed by a CU of the first RAN device. Further, when the CU includes a CU-CP and a CU-UP, the operations performed by the first RAN device in the foregoing operations are performed by the CU-CP of the first RAN device. Similarly, when the first network device is a second RAN device and the second RAN device is in a CU-DU split architecture, the operations performed by the first network device in the foregoing operations in this embodiment are performed by a CU of the second RAN device. Further, when the CU includes a CU-CP and a CU-UP, the operations performed by the first network device in the foregoing operations are performed by the CU-CP of the second RAN device. It should be understood that the CU-CP may store the RAN device computing capability information in the CU-CP or the CU-UP.

According to the foregoing operations in this embodiment, a RAN device notifies another network device of RAN device computing capability information of the RAN device, so that another network device is enabled to provide a computing service by using a computing capability of the RAN device.

Figure 4:
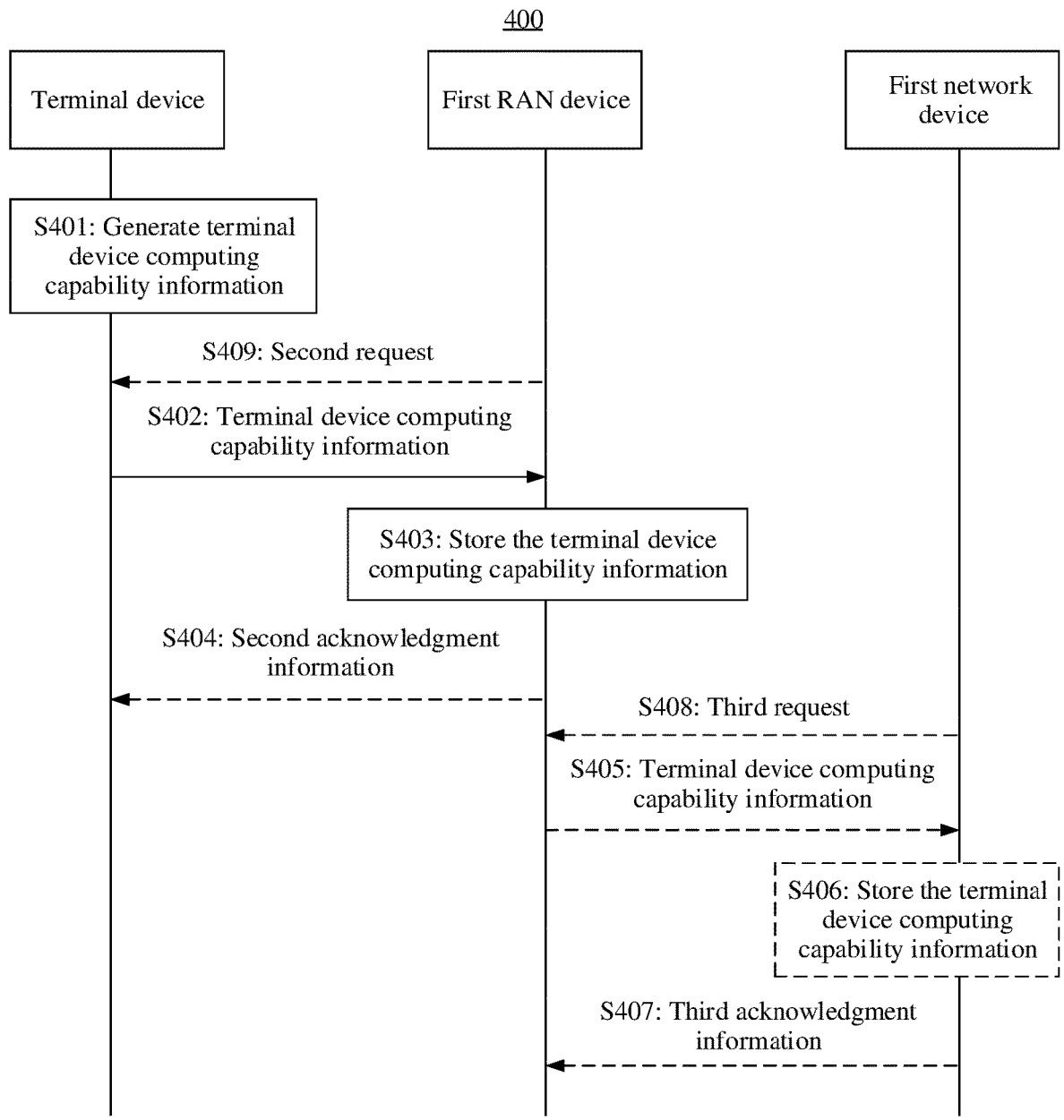
FIG. 4 is a schematic flowchart of a method for reporting a computing capability of a terminal device according to an embodiment.

FIG. 4 is a schematic flowchart of a method 400 for reporting a computing capability of a terminal device according to an embodiment. The method 400 is applied to interaction between a terminal device and a RAN device wirelessly connected to the terminal device, and interaction with another network device is implemented by using the RAN device, so that the RAN device and another network device may be enabled to obtain terminal device computing capability information. It should be understood that information exchange between the terminal device and the RAN device is implemented by using an access stratum (AS) message. A procedure in FIG. 4 includes the following operations.

S401: A terminal device generates terminal device computing capability information.

In this operation, the terminal device generates the terminal device computing capability information of the terminal device based on a current resource status and/or a policy of the terminal device. It should be understood that because resource usage statuses of the terminal device are different at different moments, the terminal device computing capability information dynamically changes.

S402: The terminal device sends the terminal device computing capability information of the terminal device to a first RAN device. Correspondingly, the first RAN device receives the terminal device computing capability information from the terminal device.

Usually, the terminal device may periodically send the terminal device computing capability information to the first RAN device. Alternatively, the terminal device computing capability information may be sent to the first RAN device in a form of event triggering, for example, when an available resource of the terminal device reaches a preset threshold, or when the terminal device receives a computing capability request from another network device.

The terminal device may send the terminal device computing capability information in a plurality of forms. In one form, the terminal device sends complete terminal device computing capability information, where the complete terminal device computing capability information includes parameters in current terminal device computing capability information of the terminal device and values of the parameters. In another form, the terminal device sends a part of the terminal device computing capability information, where the part of the terminal device computing capability information includes a part of parameters in current terminal device computing capability information of the terminal device and a value of the part of parameters. For example, the terminal device may send, in current sending, a parameter that is changed from that in terminal device computing capability information that is sent last time and a value of the parameter, a value change amount of the changed parameter, or the like. A form in which the terminal device sends the terminal device computing capability information is not limited.

It should be understood that the first RAN device is a RAN device wirelessly connected to the terminal device. Optionally, the RAN device is a serving RAN device of the terminal device and provides a data transmission service for the terminal device.

Optionally, the terminal device includes the terminal device computing capability information in a terminal device (UE) capability information message and a measurement report message that are sent to the first RAN device.

S403: The first RAN device stores the terminal device computing capability information of the terminal device.

In this operation, after receiving the terminal device computing capability information from the terminal device, the first RAN device stores the terminal device computing capability information.

Optionally, when the first RAN device periodically receives the terminal device computing capability information sent by the terminal device, the first RAN device also periodically stores the latest received terminal device computing capability information. When the first RAN device aperiodically receives the terminal device computing capability information sent by the terminal device, each time the first RAN device newly receives the terminal device computing capability information, the first RAN device stores the latest received terminal device computing capability information.

When the first RAN device receives complete terminal device computing capability information, the first RAN device directly stores the received terminal device computing capability information. When the first RAN device receives a part of the terminal device computing capability information, the first RAN device updates stored terminal device computing capability information based on the received part of the terminal device computing capability information, to store new complete terminal device computing capability information.

S404: The first RAN device sends second acknowledgment information to the terminal device. Correspondingly, the terminal device receives the second acknowledgment information sent by the first RAN device. The second acknowledgment information is for confirming that the first RAN device correctly receives the terminal device computing capability information sent by the terminal device.

It should be understood that operation S404 is optional.

According to the foregoing operations in this embodiment, a terminal device notifies a RAN device connected to the terminal device of terminal device computing capability information of the terminal device, so that the RAN device is enabled to use a computing capability of the terminal device in a subsequent computing service.

Optionally, this embodiment may further include the following operations S405 to S408. It should be understood that there may be no coupling relationship between operations S405 to S408 and the foregoing operations S401 to S404, and operations S405 to S408 may be performed provided that the first RAN device has the terminal device computing capability information.

S405: The first RAN device forwards the terminal device computing capability information to a first network device. Correspondingly, the first network device receives the terminal device computing capability information from the first RAN device.

S406: The first network device stores the received terminal device computing capability information.

S407: The first network device sends third acknowledgment information to the first RAN device. Correspondingly, the first RAN device receives the third acknowledgment information from the first network device. The third acknowledgment information is for confirming that the first network device correctly receives the terminal device computing capability information sent by the first RAN device.

S408: The first network device sends a third request to the first RAN device. Correspondingly, the first RAN device receives the third request from the first network device. The third request is for requesting the first RAN device to send the terminal device computing capability information.

Steps S405 to S408 are respectively similar to operations S302 to S305 in the foregoing embodiment. Details are not described herein again. A main difference is that in this embodiment, the first network device receives and stores the terminal device computing capability information sent by the first RAN device, but in the foregoing embodiment, the first network device receives and stores the RAN device computing capability information sent by the first RAN device. Optionally, in operation S405, the first RAN device includes the terminal device computing capability information in a RAN configuration update message sent to the first network device. In operation S407, the first network device includes the third acknowledgment information in a RAN configuration update acknowledgment message sent to the first RAN device.

Optionally, this embodiment further includes operation S409.

S409: The first RAN device sends a second request to the terminal device. Correspondingly, the terminal device receives the second request from the first RAN device. The second request is for requesting the terminal device to report the terminal device computing capability information.

Optionally, the first RAN device requests the terminal device to periodically report the terminal device computing capability information. In this case, the second request further includes information about a period in which the terminal device reports the terminal device computing capability information and that is configured by the first RAN device.

Optionally, the first RAN device includes the second request in a terminal device (UE) capability enquiry message sent to the terminal device.

Optionally, operation S404 is not included when operation S409 is included in this embodiment, or operation S409 is not included when operation S404 is included.

It should be noted that, when the first RAN device is in a CU-DU split architecture, the operations performed by the first RAN device in the foregoing operations in this embodiment are performed by a CU of the first RAN device. Further, when the CU includes a CU-CP and a CU-UP, the operations performed by the first RAN device in the foregoing operations are performed by the CU-CP of the first RAN device, and the CU-CP may store the terminal device computing capability information in the CU-CP or the CU-UP. It should be understood that the terminal device interacts with the CU or the CU-CP of the first RAN device via a DU of the first RAN device that is wirelessly connected to the terminal device. Similarly, when the first network device is a second RAN device and the second RAN device is in a CU-DU split architecture, the operations performed by the first network device in the foregoing operations in this embodiment are performed by a CU of the second RAN device. Further, when the CU includes a CU-CP and a CU-UP, the operations performed by the first network device in the foregoing operations are performed by the CU-CP of the second RAN device. It should be understood that the CU-CP may store the terminal device computing capability information in the CU-CP or the CU-UP.

According to the foregoing operations in this embodiment, a network device obtains terminal device computing capability information of a terminal device via a RAN device connected to the terminal device, so that the network device is enabled to use a computing capability of the terminal device in a subsequent computing service.

In the embodiment in which a network device obtains the terminal device computing capability information, the method 400 gives descriptions about that the terminal device sends the terminal device computing capability information to the network device via an AS message. When the first network device is a CN device, the terminal device may alternatively send the terminal device computing capability information to the CN device via a NAS message. In this case, the RAN device wirelessly connected to the terminal device or another RAN device can obtain the terminal device computing capability information only through forwarding by the CN device.

Figure 5:
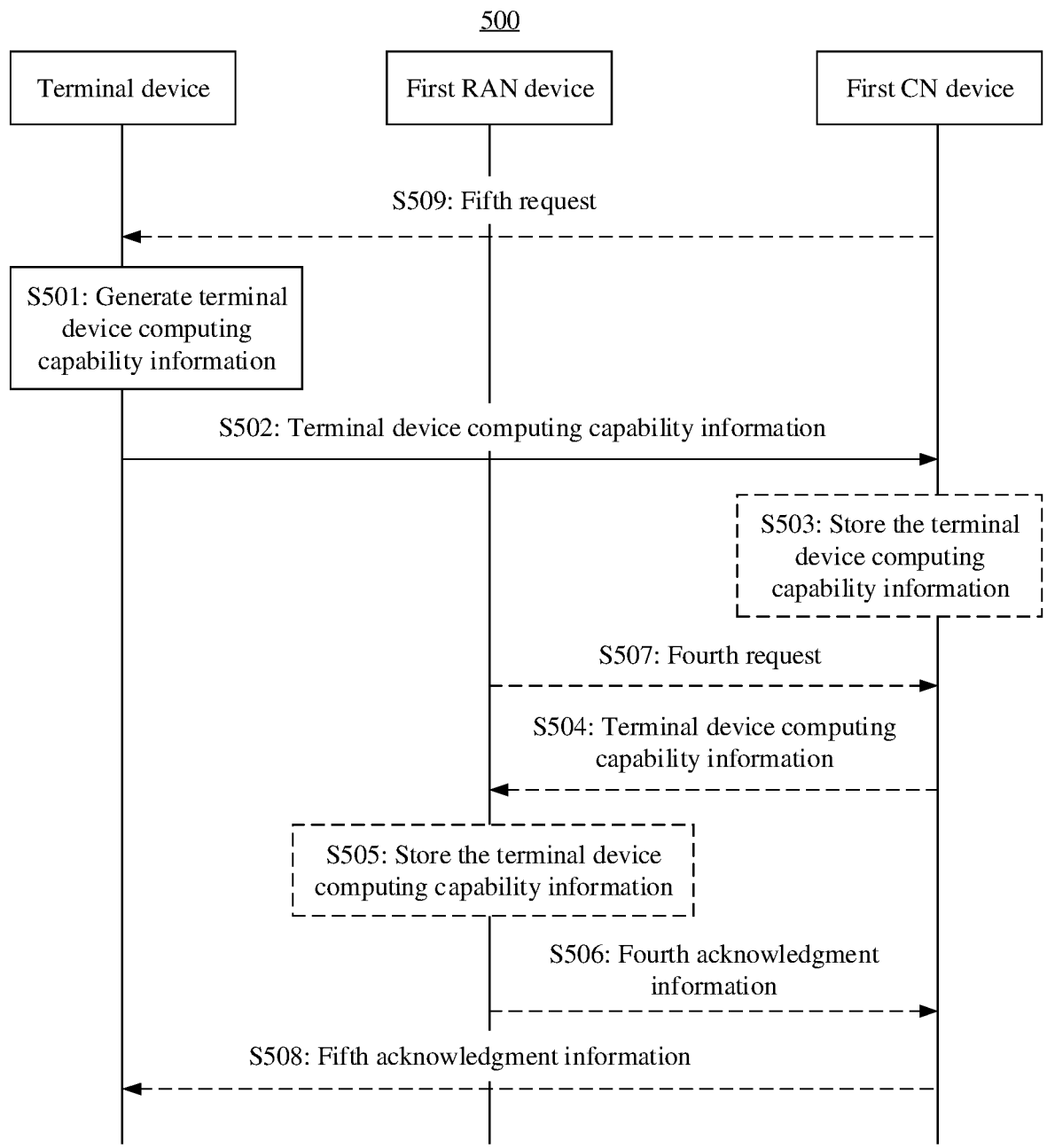
FIG. 5 is a schematic flowchart of another method for reporting a computing capability of a terminal device according to an embodiment.

FIG. 5 is a schematic flowchart of another method for reporting a computing capability of a terminal device according to an embodiment. The method 500 is applied to interaction between a terminal device and a CN device, so that the CN device is enabled to obtain terminal device computing capability information. Further, interaction with a RAN device may be implemented by using the CN device, so that the RAN device is enabled to obtain the terminal device computing capability information. A procedure in FIG. 5 includes the following operations.

S501: A terminal device generates terminal device computing capability information.

This operation is similar to operation S401 in the foregoing embodiment. Details are not described herein again.

S502: The terminal device sends the terminal device computing capability information to a first CN device. Correspondingly, the first CN device receives the terminal device computing capability information from the terminal device.

In this operation, the terminal device sends a NAS message to the first CN device via a first RAN device connected to the terminal device. The NAS message carries the terminal device computing capability information. It should be understood that, after receiving the NAS message sent by the terminal device, the first RAN device does not parse the message, but forwards the message to the first CN device.

Optionally, the terminal device includes the terminal device computing capability information in a registration request message sent to the first CN device.

S503: The first CN device stores the terminal device computing capability information.

S504: The first CN device sends the terminal device computing capability information to the first RAN device. Correspondingly, the first RAN device receives the terminal device computing capability information from the first CN device.

S505: The first RAN device stores the terminal device computing capability information.

S506: The first RAN device sends fourth acknowledgment information to the first CN device. Correspondingly, the first CN device receives the fourth acknowledgment information from the first RAN device. The fourth acknowledgment information is for confirming that the first RAN device correctly receives the terminal device computing capability information sent by the first CN device.

S507: The first RAN device sends a fourth request to the first CN device. Correspondingly, the first CN device receives the fourth request from the first RAN device. The fourth request is for requesting the first CN device to send the terminal device computing capability information.

S508: The first CN device sends fifth acknowledgment information to the terminal device. Correspondingly, the terminal device receives the fifth acknowledgment information from the first CN device. The fifth acknowledgment information is for confirming that the first CN device correctly receives the terminal device computing capability information sent by the terminal device.

It should be understood that operation S508 is optional.

The fifth acknowledgment information is also carried in a NAS message. Optionally, the first CN device includes the fifth acknowledgment information in a registration accept message sent to the terminal device.

Steps S502 and S503 are respectively similar to operations S302 and S303 in the foregoing embodiment. Details are not described herein again. A main difference is that in this embodiment, the first CN device receives and stores the terminal device computing capability information sent by the terminal device, but in the foregoing embodiment, the first network device receives and stores the RAN device computing capability information sent by the first RAN device.

It should be understood that operation S503 is optional. This operation is performed when the first CN device needs to store the terminal device computing capability information. If the first CN device does not need to store the terminal device computing capability information, this operation does not need to be performed.

Steps S504 to S507 are respectively similar to operations S302 to S305 in the foregoing embodiment. Details are not described herein again. A main difference is that in this embodiment, the first RAN device receives and stores the terminal device computing capability information sent by the first CN device, but in the foregoing embodiment, the first network device receives and stores the RAN device computing capability information sent by the first RAN device. Optionally, in operation S504, the first CN device includes the terminal device computing capability information in an initial context setup request message or a UE context modification request message sent to the first RAN device. In operation S506, the first RAN device includes the fourth acknowledgment information in an initial context setup response message or a UE context modification response message sent to the first CN device. It should be understood that there may be no coupling relationship between operations S504 to S507 and the foregoing operations S501 to S503, and operations S504 to S507 may be performed provided that the first CN device has the terminal device computing capability information.

It should be understood that the foregoing operations S504 to S507 are optional. These operations are performed when the first RAN device needs to store the terminal device computing capability information. If the first RAN device does not need to store the terminal device computing capability information, these operations do not need to be performed.

It should be noted that, in operations S502 and S508, the NAS message exchanged between the terminal device and the first CN device is forwarded via the first RAN device, and the first RAN device is a RAN device that has a wireless connection to the terminal device. In operations S504 to S507, the first RAN device is not limited to a RAN device that has a wireless connection to the terminal device or may be any RAN device connected to the first CN device.

Optionally, operation S508 is not included when operation S509 is included in this embodiment, or operation S509 is not included when operation S508 is included.

Optionally, the first CN device is an AMF.

It should be noted that, when the first RAN device is in a CU-DU split architecture, the operations performed by the first RAN device in the foregoing operations in this embodiment are performed by a CU of the first RAN device. Further, when the CU includes a CU-CP and a CU-UP, the operations performed by the first RAN device in the foregoing operations are performed by the CU-CP of the first RAN device, and the CU-CP may store the terminal device computing capability information in the CU-CP or the CU-UP. It should be understood that the terminal device interacts with the CU or the CU-CP of the first RAN device via a DU of the first RAN device.

According to the foregoing operations in this embodiment, a CN device and/or a RAN device connected to the CN device obtain/obtains terminal device computing capability information of a terminal device, so that the CN device and/or the RAN device are/is enabled to use a computing capability of the terminal device in a computing service.

According to the foregoing method 300, method 400, and method 500, RAN device computing capability information of one RAN device is obtained by another RAN device or a CN device, or terminal device computing capability information of one terminal device is obtained by a RAN device or a CN device, so that a network can provide a computing service for another RAN device by using a computing capability of one RAN device or one terminal device.

Figure 6:
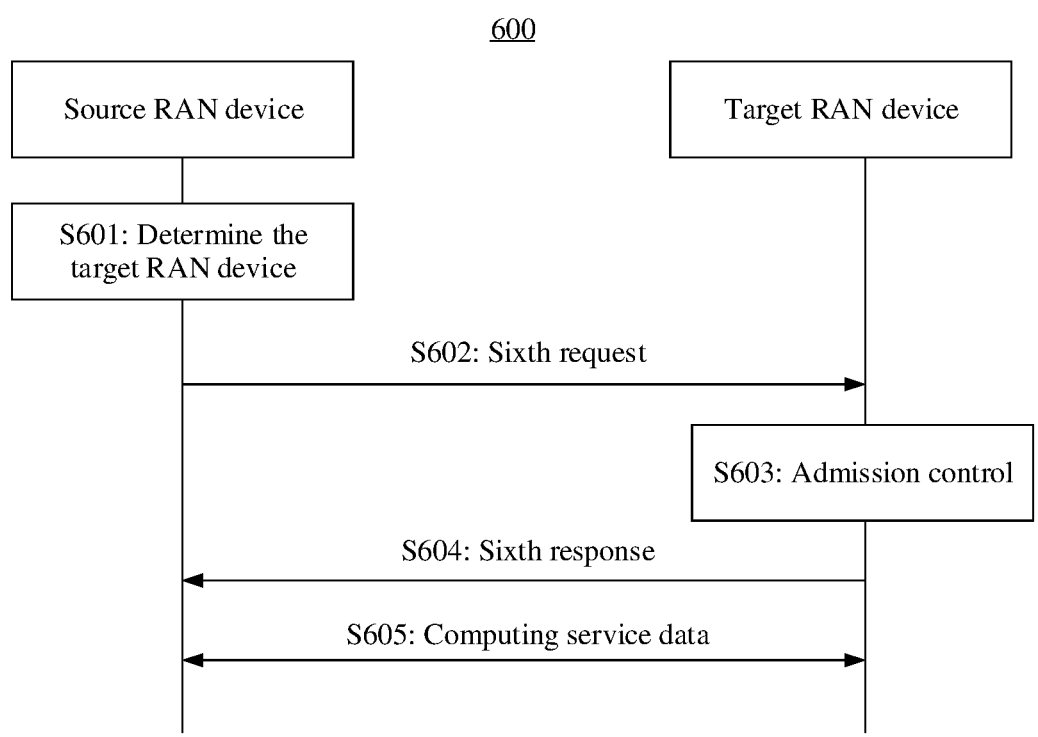
FIG. 6 is a schematic flowchart of a method for requesting a RAN device to provide a computing service according to an embodiment.

FIG. 6 is a schematic flowchart of a method for requesting a RAN device to provide a computing service according to an embodiment. The method 600 is applied to a scenario in which one RAN device (also referred to as a source RAN device) requests another RAN device (also referred to as a target RAN device) to provide a computing service for the RAN device. An Xn interface exists between the two RAN devices for communication. A procedure in FIG. 6 includes the following operations.

S601: A source RAN device determines a target RAN device.

In this operation, the source RAN device determines, based on RAN device computing capability information of other RAN devices that is obtained by the source RAN device, the target RAN device that can provide a computing service for the source RAN device.

For example, the source RAN device may obtain the RAN device computing capability information of the other RAN devices through interaction between RAN devices. Alternatively, the source RAN device may obtain, by interacting with a CN device, the RAN device computing capability information of the other RAN devices stored on the CN device.

Usually, the RAN device computing capability information includes a type of a computing service supported by the RAN device. Further, the RAN device computing capability information further includes resources that can be used by the RAN device for various types of computing services in one or more computing service types supported by the RAN device. For example, one RAN device supports two types of computing services: an AI model #1 and an AI model #2. In this case, the RAN device computing capability information may include the two types of computing services. Further, the RAN device computing capability information may further include a CPU/GPU/storage resource that can be used by the RAN device for a computing service of the AI model #1 type, and a CPU/GPU/storage resource that can be used for a computing service of the AI model #2 type.

The source RAN device determines, based on a QoS requirement of a computing service to be performed by the source RAN device and with reference to the RAN device computing capability information of another RAN device obtained by the source RAN device, one or more RAN devices in the other RAN devices as target RAN devices. The one or more target RAN devices are configured to provide the computing service for the source RAN device. In a possible implementation, one or more RAN devices in the other RAN devices can each meet the QoS requirement of the computing service of the source RAN device. In this case, the source RAN device determines one RAN device from the one or more RAN devices as the target RAN device. In another possible implementation, no RAN device in the other RAN devices can independently meet the QoS requirement of the computing service of the source RAN device. In this case, the source RAN device determines a plurality of RAN devices from the other RAN devices as target RAN devices, and a sum of computing capabilities of all RAN devices in the plurality of RAN devices can meet the QoS requirement of the computing service of the source RAN device. In still another possible implementation, the source RAN device may determine a plurality of RAN devices as target RAN devices according to a policy, for example, for consideration of load balancing and fault tolerance performance. A sum of computing capabilities of all RAN devices in the plurality of RAN devices meets or exceeds the QoS requirement of the computing service of the source RAN device.

For example, the computing service required by the source RAN device includes two types of computing services: the AI model #1 and the AI model #2. The computing service of the AI model #1 includes a computing service flow #1A and a computing service flow #1B. The computing service of the AI model #2 includes a computing service flow #2A. In this operation, in a possible implementation, based on the RAN device computing capability information of the other RAN devices that is obtained by the source RAN device, the source RAN device determines a RAN device that can support both the computing service types of the AI model #1 and the AI model #2 as the target RAN device. Further, the source RAN device may alternatively estimate, based on QoS requirements of the computing service flow #1A, the computing service flow #1B, and the computing service flow #2A, a CPU/GPU/storage resource that needs to be occupied by each computing service flow, and determine, with reference to the obtained available CPU/GPU/storage resources of the other RAN devices, a RAN device that can meet all the QoS requirements of the computing service flows as the target RAN device. In another possible implementation, the source RAN device may determine one RAN device that supports the computing service type of the AI model #1 as one target RAN device and determine another RAN device that supports the computing service type of the AI model #2 as another target RAN device. In this implementation, the source RAN device determines that a plurality of target RAN devices separately perform parts of the computing service. In still another possible implementation, the source RAN device may determine a plurality of RAN devices that support both the computing service types of the AI model #1 and the AI model #2 as target RAN devices, so that the target RAN devices separately perform parts of the computing service, or separately perform the complete compute service for backup or fault tolerance. It should be understood that the source RAN device may alternatively determine the target RAN device in another manner. This is not limited.

S602: The source RAN device sends a sixth request to the target RAN device. Correspondingly, the target RAN device receives the sixth request from the source RAN device. The sixth request indicates that the source RAN device requests the target RAN device to provide the computing service.

The sixth request includes the QoS requirement of the computing service of the source RAN device.

It should be understood that the target RAN device in this operation is any one of the one or more target RAN devices determined by the source RAN in operation S601. If the source RAN device determines one RAN device as the target RAN device in operation S601, in this operation, the source RAN device sends the sixth request to the RAN device. The sixth request is for requesting the RAN device to provide all computing services for the source RAN device. If the source RAN device determines a plurality of RAN devices as target RAN devices in operation S601, in this operation, the source RAN device separately sends the sixth request to each RAN device in the plurality of RAN devices. The sixth request is for requesting the RAN devices to provide parts of or complete computing service for the source RAN device.

For example, the sixth request includes one or more computing service flows requested by the source RAN device and information about a resource required by each computing service flow.

S603: The target RAN device performs admission control on the computing service request.

In this operation, the target RAN device performs admission control on the one or more computing service flows received from the source RAN device.

It should be understood that the target RAN device admits, based on a resource status and/or a policy of the target RAN device, the one or more computing service flows from the source RAN device. In a possible implementation, the target RAN device admits all computing service flows of the source RAN device in the sixth request. In another possible implementation, the target RAN device admits a part of the computing service flows of the source RAN device in the sixth request.

S604: The target RAN device sends a sixth response to the source RAN device. Correspondingly, the source RAN device receives the sixth response from the target RAN device. The sixth response is a response of the target RAN device to the sixth request and indicates a computing service flow that is requested by the source RAN device and that is admitted by the target RAN device.

The sixth response may include respective identification information of one or more computing service flows that are requested by the source RAN device and that are admitted by the target RAN device. In addition, the sixth response further includes transport layer information of the target RAN device, for example, Xn tunnel transport layer information of the target RAN device (for example, an IP address and/or a TEID of the target RAN device).

S605: The source RAN device exchanges computing service data with the target RAN device.

In this operation, the source RAN device transmits data of one or more computing service flows to the target RAN device. It should be understood that the one or more computing service flows are computing service flows admitted by the target RAN device. The target RAN device processes the data of the one or more computing service flows, generates result data, and sends the result data to the source RAN device. Optionally, in a process in which the target RAN device performs service computing, the source RAN device and the target RAN device further exchange intermediate data of the computing service. In other words, before generating the result data, the target RAN device needs to exchange intermediate data in a processing process with the source RAN device. It should be understood that when there may be a plurality of target RAN devices, this operation is for computing service data exchange between the source RAN device and each of the plurality of target RAN devices.

It should be noted that, when the source RAN device is in a CU-DU split architecture, the operations performed by the source RAN device in the foregoing operations in this embodiment are performed by a CU of the source RAN device. Further, when the CU includes a CU-CP and a CU-UP, the operations performed by the source RAN device in the foregoing operations are performed by the CU-CP of the source RAN device. Similarly, when the target RAN device is in a CU-DU split architecture, the operations performed by the target RAN device in the foregoing operations in this embodiment are performed by a CU of the target RAN device. Further, when the CU includes a CU-CP and a CU-UP, the operations performed by the target RAN device in the foregoing operations are performed by the CU-CP of the target RAN device.

According to the foregoing operations in this embodiment, a source RAN device directly communicates with a target RAN device, and the target RAN device is used to implement a computing service of the source RAN device. This resolves a problem that the source RAN device cannot independently complete the computing service.

In the foregoing method 600, the source RAN device interacts with the target RAN device through an Xn interface, to implement the computing service of the source RAN device by using the target RAN device. In an actual network, the Xn interface may not exist between the source RAN device and the target RAN device. For example, when the source RAN device and the target RAN device are deployed at a long distance from each other, the source RAN device needs to interact with the target RAN device via the CN device.

Figure 7:
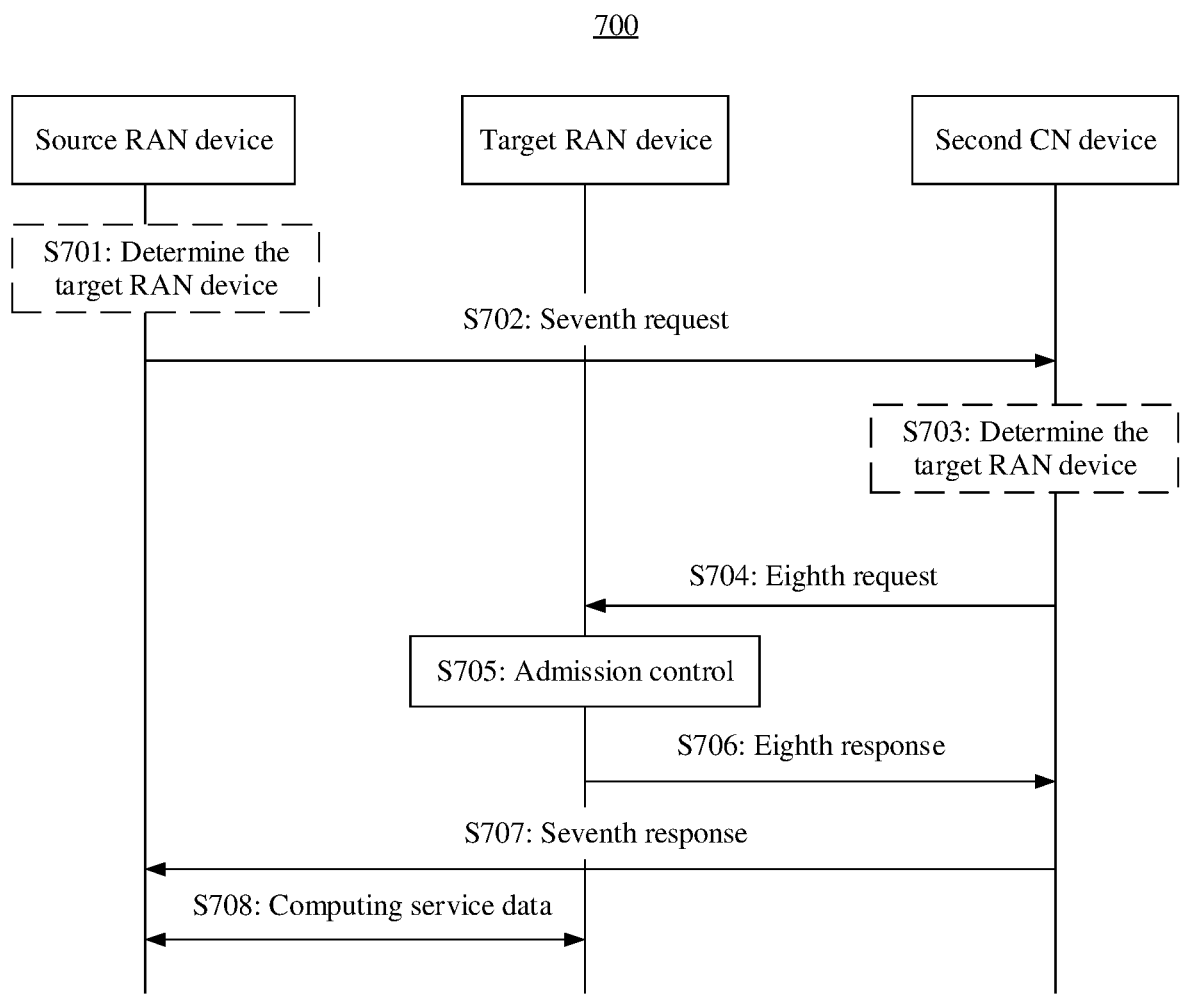
FIG. 7 is a schematic flowchart of another method for requesting a RAN device to provide a computing service according to an embodiment.

FIG. 7 is a schematic flowchart of another method for requesting a RAN device to provide a computing service according to an embodiment. The method 700 is applied to a scenario in which one RAN device (also referred to as a source RAN device) requests another RAN device (also referred to as a target RAN device) to provide a computing service for the RAN device. Communication between the source RAN and the target RAN device needs to be implemented by communication between the source RAN and a second CN device, and then by communication between the second CN device and the target RAN device. For example, the second CN device is separately connected to the source RAN device and the target RAN device through an NG interface. A procedure in FIG. 7 includes the following operations.

S701: A source RAN device determines a target RAN device.

This operation is similar to operation S601 in the foregoing embodiment. Details are not described herein again.

Step 701 is optional.

S702: The source RAN device sends a seventh request to a second CN device. Correspondingly, the second CN device receives the seventh request from the source RAN device.

In a possible implementation, when the source RAN device determines the target RAN device in operation S701, the seventh request indicates that the source RAN device requests the target RAN device to provide a computing service. In this case, in addition to the content of the sixth request in the foregoing embodiment, the seventh request further includes identification information of each of one or more target RAN devices determined by the source RAN device.

In another possible implementation, if operation S701 is not included in this embodiment, the seventh request indicates that the source RAN device requests another RAN device to provide a computing service. In this case, content included in the seventh request is the same as the content included in the sixth request in the foregoing embodiment. In this case, the seventh request only indicates that the source RAN device requests a computing service provided by another RAN device but does not indicate one or more target RAN devices that provide the computing service.

S703: The second CN device determines a target RAN device.

In this operation, the second CN device determines, based on RAN device computing capability information of different RAN devices that is obtained by the second CN device, the target RAN device that can provide a computing service for the source RAN device.

For example, the second CN device may obtain the RAN device computing capability information of each RAN device through interaction with different RAN devices. Alternatively, the second CN device may obtain the RAN device computing capability information of each RAN device from RAN device computing capability information stored in the second CN device.

This operation is similar to operation S601 in the foregoing embodiment. Details are not described herein again. A main difference is that in this operation, the second CN device determines, based on a QoS requirement of the computing service obtained in operation S702, and with reference to the RAN device computing capability information of each RAN device obtained by the second CN device, one or more RAN devices as target RAN devices, but in the foregoing embodiment, the source RAN device determines, based on the QoS requirement of the computing service to be performed by the source RAN device, and with reference to the RAN device computing capability information of each RAN device obtained by the source RAN device, one or more RAN devices as target RAN devices.

Step S703 is optional. Step S703 may not be included when operation S701 is included in this embodiment. Step S703 may be included when operation S701 is not included in this embodiment.

S704: The second CN device sends an eighth request to the target RAN device. Correspondingly, the target RAN device receives the eighth request from the second CN device. The eighth request indicates that the source RAN device requests the target RAN device to provide the computing service.

In a possible implementation, if this embodiment includes the foregoing operation S701, in this operation, the second CN device separately sends the eighth request to each target RAN device indicated by the identification information of the one or more target RAN devices obtained by the second CN device from the seventh request in operation S702. In another possible implementation, if this embodiment includes the foregoing operation S703, in this operation, the second CN device separately sends the eighth request to the one or more target RAN devices determined by the second CN device.

S705: The target RAN device performs admission control on the computing service request.

S706: The target RAN device sends an eighth response to the second CN device. Correspondingly, the second CN device receives the eighth response from the target RAN device. The eighth response is a response of the target RAN device to the eighth request and indicates a computing service flow that is requested by the source RAN device and that is admitted by the target RAN device.

The eighth response may include respective identification information of one or more computing service flows that are requested by the source RAN device and that are admitted by the target RAN device. In addition, the eighth response further includes transport layer information of the target RAN device, for example, Xn tunnel transport layer information of the target RAN device.

Steps S704 to S706 are similar to operations S602 to S604 in the foregoing embodiment. Details are not described herein again. A main difference is that in this embodiment, the second CN device requests the target RAN device to perform the computing service of the source RAN device, but in the foregoing implementation, the source RAN device requests the target RAN device to perform the computing service of the source RAN device.

S707: The second CN device sends a seventh response to the source RAN device. Correspondingly, the source RAN device receives the seventh response from the second CN device. The seventh response is a response of the second CN device to the seventh request and indicates the computing service flow that is requested by the source RAN device and that is admitted by the target RAN device.

The seventh response may include the identification information of each of the one or more target RAN devices and the respective identification information of the one or more computing service flows that are requested by the source RAN device and that are admitted by each target RAN device. In addition, the seventh response further includes the transport layer information of each target RAN device, for example, the Xn tunnel transport layer information of each target RAN device.

S708: The source RAN device exchanges computing service data with the target RAN device.

This operation is similar to operation S605 in the foregoing embodiment. Details are not described herein again.

It should be noted that, when the source RAN device is in a CU-DU split architecture, the operations performed by the source RAN device in the foregoing operations in this embodiment are performed by a CU of the source RAN device. Further, when the CU includes a CU-CP and a CU-UP, the operations performed by the source RAN device in the foregoing operations are performed by the CU-CP of the source RAN device. Similarly, when the target RAN device is in a CU-DU split architecture, the operations performed by the target RAN device in the foregoing operations in this embodiment are performed by a CU of the target RAN device. Further, when the CU includes a CU-CP and a CU-UP, the operations performed by the target RAN device in the foregoing operations are performed by the CU-CP of the target RAN device.

According to the foregoing operations in this embodiment, a source RAN device communicates with a target RAN device via a CN device, and the target RAN device is used to implement a computing service of the source RAN device. This resolves a problem that the source RAN device cannot independently complete the computing service.

In the foregoing method 700, both the source RAN device and the target RAN device are connected to the second CN device through an NG interface. In an actual network, the source RAN device and the target RAN device may not be both connected to the second CN device. In this case, the second CN device needs to communicate with the target RAN device via another CN device. In this case, the second CN device is referred to as a source CN device, and another CN device via which the source CN device communicates with the target RAN device is referred to as a target CN device. This process is also referred to as CN device relocation. To implement CN device relocation, the source CN device needs to search a network management device for a CN device connected to the target RAN device. The network management device may be referred to as a computing configuration function (CCF). It should be understood that the name is merely an example, and another name may be used in an actual network. This is not limited. The CCF has the following functions: searching and providing configuration information of an AMF that supports a computing service, discovering a computing service across AMFs, and exchanging application layer data.

Figure 8:
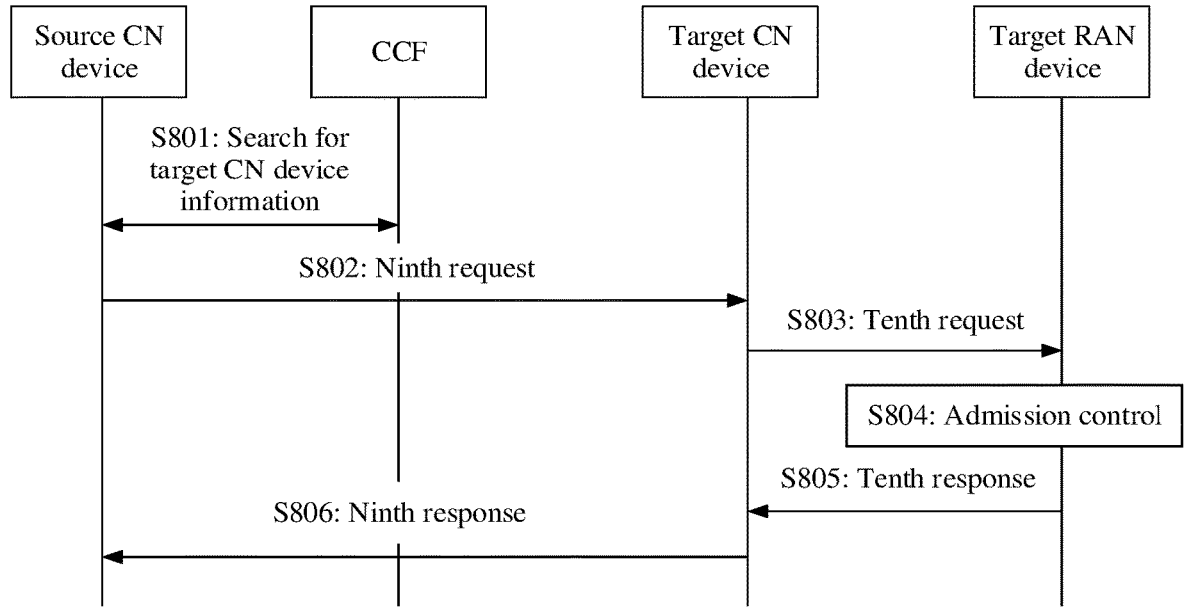
FIG. 8 is a schematic flowchart of a method for requesting a target RAN device to provide a computing service by a source CN device according to an embodiment.

FIG. 8 is a schematic flowchart of a method for requesting a target RAN device to provide a computing service by a source CN device according to an embodiment. The method 800 corresponds to the functions completed in operations S704 to S706 in the foregoing embodiment. The source CN device and the target RAN device in FIG. 8 respectively correspond to the second CN device and the target RAN device in FIG. 7. A procedure in FIG. 8 includes the following operations.

S801: A source CN device searches a CCF for target CN device information.

In this operation, the source CN device obtains the target CN device information from the CCF. The source CN device may send, to the CCF, the identification information that is of each of the one or more target RAN devices and that is obtained by the source CN device in operation S702 in the foregoing embodiment. The CCF determines, based on the identification information, information about one or more target CN devices connected to the one or more target RAN devices, for example, identification information of the CN device, and sends the identification information of the one or more target CN devices to the source CN device. Optionally, the CCF sends, to the source CN device, the identification information of the one or more target CN devices and the identification information of the one or more target RAN devices connected to the one or more target CN devices.

In this operation, the source CN device obtains the identification information of the one or more target CN devices corresponding to the one or more target RAN devices. For example, the source CN device obtains a target RAN device #1, a target RAN device #2, and a target RAN device #3 in operation S702 in the foregoing embodiment. The target RAN device #1 and the target RAN device #2 are connected to a target CN device #1. The target RAN device #3 is connected to a target CN device #2. Optionally, in this operation, the source CN device obtains the following two parts of information: one part of information is an identifier of the target CN device #1 and respective identifiers of the target RAN device #1 and the target RAN device #2 corresponding to the target CN device #1; and the other part of information is an identifier of the target CN device #2 and an identifier of the target RAN device #3 corresponding to the target CN device #2.

S802: The source CN device sends a ninth request to the target CN device. Correspondingly, the target CN device receives the ninth request from the source CN device. The ninth request indicates that a source RAN device requests a target RAN device to provide a computing service.

For example, in the foregoing example, the source CN device sends the ninth request to the target CN device #1. The ninth request includes an identifier of the target RAN device #1 and a computing service that the source RAN device requests to provide by the target RAN device #1, and an identifier of the target RAN device #2 and a computing service that the source RAN device requests to provide by the target RAN device #2. The source CN device sends the ninth request to the target CN device #2. The ninth request includes an identifier of the target RAN device #3 and a computing service that the source RAN device requests to provide by the target RAN device #3.

S803: The target CN device sends a tenth request to the target RAN device. Correspondingly, the target RAN device receives the tenth request from the target CN device. The tenth request indicates that the source RAN device requests the target RAN device to provide the computing service.

For example, in the foregoing example, the target CN device #1 sends the tenth request to the target RAN device #1. The tenth request includes the computing service that the source RAN device requests to provide by the target RAN device #1. The target CN device #1 sends the tenth request to the target RAN device #2. The tenth request includes the computing service that the source RAN device requests to provide by the target RAN device #2. The target CN device #2 sends the tenth request to the target RAN device #3. The tenth request includes the computing service that the source RAN device requests to provide by the target RAN device #3.

S804: The target RAN device performs admission control on the computing service request.

For example, in the foregoing example, the target RAN device #1 performs admission control on one or more computing service flows for which the source RAN device requests the target RAN device #1 to provide a computing service. The target RAN device #2 performs admission control on one or more computing service flows for which the source RAN device requests the target RAN device #2 to provide a computing service. The target RAN device #3 performs admission control on one or more computing service flows for which the source RAN device requests the target RAN device #3 to provide a computing service.

S805: The target RAN device sends a tenth response to the target CN device. Correspondingly, the target CN device receives the tenth response from the target RAN device. The tenth response is a response of the target RAN device to the tenth request and indicates a computing service flow that is requested by the source RAN device and that is admitted by the target RAN device.

Steps S803 to S805 are similar to operations S602 to S604 in the foregoing embodiment. Details are not described herein again. A main difference is that in this embodiment, the target CN device requests the target RAN device to perform the computing service of the source RAN device, but in the foregoing implementation, the source RAN device requests the target RAN device to perform the computing service of the source RAN device.

S806: The target CN device sends a ninth response to the source CN device. Correspondingly, the source CN device receives the ninth response from the target CN device. The ninth response is a response of the target CN device to the ninth request and indicates a computing service flow that is requested by the source RAN device and that is admitted by the target RAN device connected to the target CN device.

It should be noted that, when the target RAN device is in a CU-DU split architecture, the operations performed by the target RAN device in the foregoing operations in this embodiment are performed by a CU of the target RAN device. Further, when the CU includes a CU-CP and a CU-UP, the operations performed by the target RAN device in the foregoing operations are performed by the CU-CP of the target RAN device.

According to the foregoing operations in this embodiment, a source CN device finds a target RAN device through CN device relocation. Further, in combination with this embodiment and the method 700, a source RAN device communicates with the target RAN device through CN device relocation, and the target RAN device is used to implement a computing service of the source RAN device. This resolves a problem that the source RAN device cannot independently complete the computing service.

Figure 9:
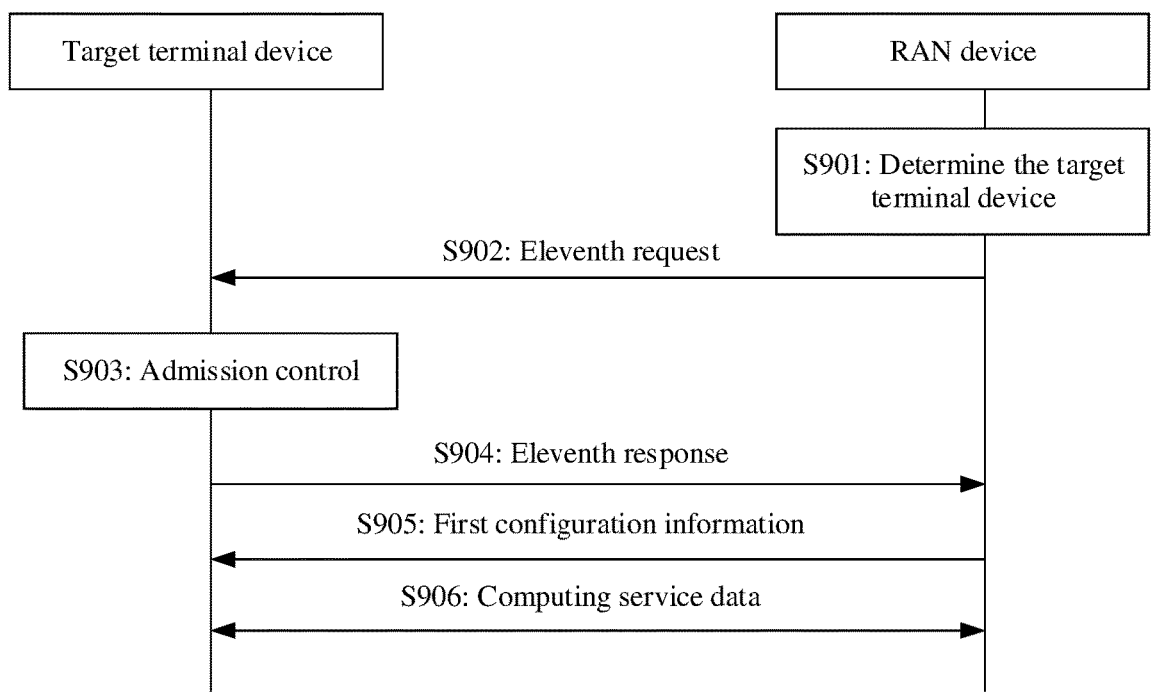
FIG. 9 is a schematic flowchart of a method for requesting a terminal device to provide a computing service according to an embodiment.

According to the foregoing method 600, method 700, and method 800, a source RAN device uses another RAN device to provide a computing service for the source RAN device. In an actual network, a RAN device may alternatively use a resource of a terminal device to implement a computing service for the RAN device. FIG. 9 is a schematic flowchart of a method for requesting a terminal device to provide a computing service according to an embodiment. The method 900 is applied to a scenario in which a RAN device requests a terminal device to provide a computing service for the RAN device. A procedure in FIG. 9 includes the following operations.

S901: A RAN device determines a target terminal device.

In this operation, the RAN device determines, based on terminal device computing capability information of one or more terminal devices that is obtained by the RAN device, one or more target terminal devices that can provide computing services for the RAN device. For example, the RAN device may obtain, according to the method 400 or the method 500, terminal device computing capability information of a terminal device to which any terminal device wirelessly connects.

The RAN device determines, based on a QoS requirement of a computing service to be performed by the RAN device, and with reference to the terminal device computing capability information of the one or more terminal devices that is obtained by the RAN device, one or more terminal devices from the one or more terminal devices as target terminal devices. The one or more target terminal devices are configured to provide the computing service for the RAN device. In a possible implementation, one or more terminal devices in the one or more terminal devices can meet the QoS requirement of the computing service of the RAN device. In this case, the RAN device determines one terminal device from the one or more terminal devices as the target terminal device. In another possible implementation, no terminal device in the one or more terminal devices can independently meet the QoS requirement of the computing service of the RAN device. In this case, the RAN device determines a plurality of terminal devices from the one or more terminal devices as target terminal devices, and a sum of computing capabilities of all terminal devices in the plurality of terminal devices can meet the QoS requirement of the computing service of the RAN device. In still another possible implementation, the RAN device may determine a plurality of terminal devices as target terminal devices according to a policy, for example, for consideration of load balancing and fault tolerance performance. A sum of computing capabilities of all terminal devices in the plurality of terminal devices meets or exceeds the QoS requirement of the computing service of the RAN device.

S902: The RAN device sends an eleventh request to the target terminal device. Correspondingly, the target terminal device receives the eleventh request from the RAN device. The eleventh request indicates that the RAN device requests the target terminal device to provide the computing service.

S903: The target terminal device performs admission control on the computing service request.

S904: The target terminal device sends an eleventh response to the RAN device. Correspondingly, the RAN device receives the eleventh response from the target terminal device.

Steps S901 to S904 are similar to operations S601 to S604 in the foregoing embodiment. Details are not described herein again. A main difference is that in this embodiment, the RAN device determines the target terminal device and requests the target terminal device to perform the computing service of the RAN device, but in the foregoing implementation, the source RAN device determines the target RAN device and requests the target RAN device to perform the computing service of the source RAN device.

It should be understood that the terminal device may be in a plurality of RRC states, for example, an RRC connected state, an RRC inactive state, or an RRC idle state. In this embodiment, if the target terminal device is in the RRC connected state, the RAN device may directly send the eleventh request to the target terminal device. If the target terminal device is in the RRC inactive state, the RAN device needs to page the target terminal device to restore the RRC connection. If the target terminal device is in the RRC idle state, the RAN device needs to page the target terminal device to enter the RRC connected state. It should be noted that the eleventh response includes respective identification information of one or more computing service flows that are requested by the RAN device and that are admitted by the target terminal device.

S905: The RAN device sends first configuration information to the target terminal device. Correspondingly, the target terminal device receives the configuration information from the RAN device. The first configuration information is for performing RRC configuration on the target terminal device, for example, configuring a running environment of the computing service on the target terminal device.

Optionally, an RRC reconfiguration message sent by the RAN device to the target terminal device carries the first configuration information.

S906: The target terminal device exchanges computing service data with the RAN device.

In this operation, the RAN device transmits data of one or more computing service flows to the target terminal device. It should be understood that the one or more computing service flows are computing service flows admitted by the target terminal device. In a possible implementation, the target terminal device processes the data of the one or more computing service flows, generates result data, and sends the result data to the RAN device. In another possible implementation, in a process in which the target terminal device performs service computing, the RAN device and the target terminal device further exchange intermediate data of the computing service. In other words, before generating the result data, the target terminal device needs to exchange intermediate data in a processing process with the RAN device. It should be understood that when there may be a plurality of target terminal devices, this operation is for computing service data exchange between the RAN device and each of the plurality of target terminal devices.

It should be noted that, when the RAN device is in a CU-DU split architecture, the operations performed by the RAN device in the foregoing operations in this embodiment are performed by a CU of the RAN device. Further, when the CU includes a CU-CP and a CU-UP, the operations performed by the RAN device in the foregoing operations are performed by the CU-CP of the RAN device. It should be understood that the terminal device interacts with the CU or the CU-CP of the RAN device via a DU of the RAN device that is wirelessly connected to the terminal device.

According to the foregoing operations in this embodiment, a RAN device requests a terminal device to implement a computing service of the RAN device. This resolves a problem that a source RAN device cannot independently complete a computing service.

In the foregoing method 900, the RAN device determines the target terminal device based on terminal device computing capability information obtained by the RAN device from a procedure of reporting computing capability information of a plurality of terminal devices. In another possible implementation, a first RAN device may obtain, by broadcasting a computing service requirement of the first RAN device, a terminal device that can meet the computing service requirement of the first RAN device and complete a computing service by using a computing capability of the device.

Figure 10:
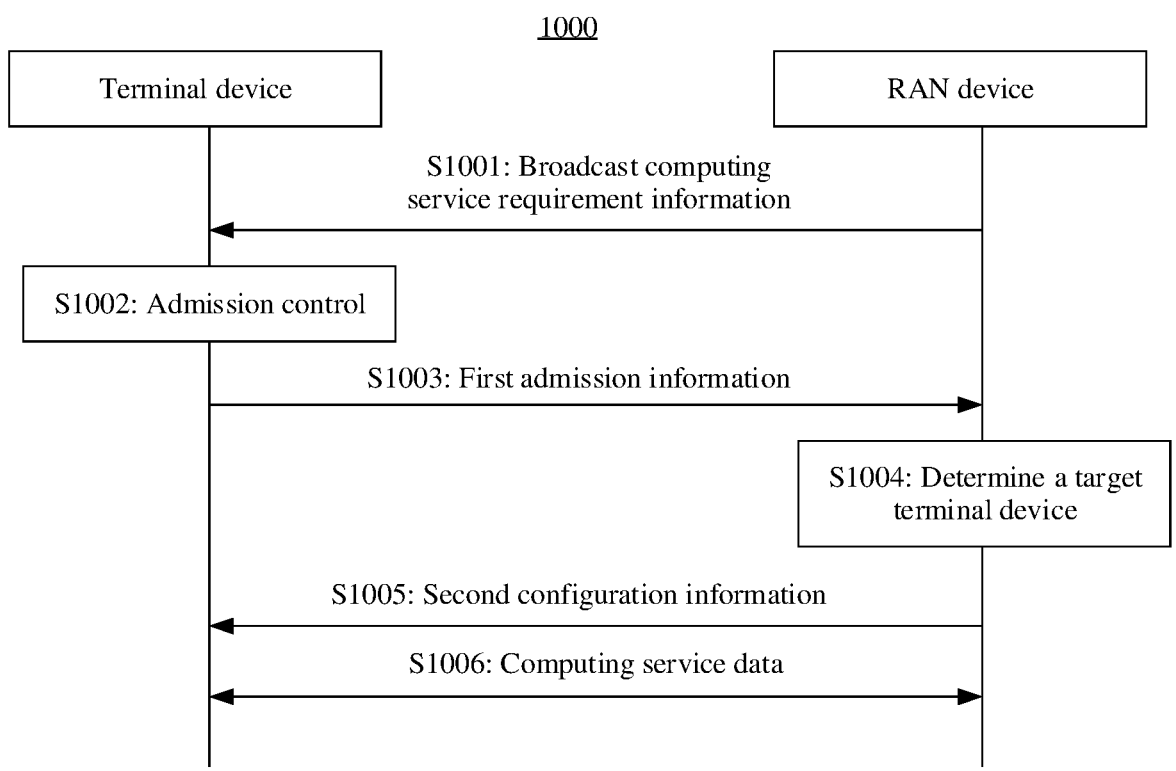
FIG. 10 is a schematic flowchart of another method for requesting a terminal device to provide a computing service according to an embodiment.

FIG. 10 is a schematic flowchart of another method for requesting a terminal device to provide a computing service according to an embodiment. The method 1000 is applied to a scenario in which a RAN device broadcasts a computing service requirement of the RAN device, and a terminal device responds to the requirement and provides a computing service for the RAN device. A procedure in FIG. 10 includes the following operations.

S1001: A RAN device broadcasts computing service requirement information.

In this operation, the RAN device broadcasts the computing service requirement information of the RAN device. Optionally, the RAN device includes the computing service requirement information of the RAN device in system information and sends the system information by broadcasting via a cell. Usually, the computing service requirement information includes one or more types of computing services that the RAN device requests to provide. Further, the computing service requirement information further includes respective QoS requirements of one or more computing service flows of each type of computing service in the one or more types of computing services.

S1002: A terminal device performs admission control on a computing service requirement.

In this operation, the terminal device performs admission control on the received computing service requirement. It should be understood that the terminal device determines, based on a resource status and/or a policy of the terminal device, whether to admit the computing service requirement from the RAN device. In a possible implementation, if the computing service requirement includes a type of a computing service, the terminal device determines a type of a computing service provided by the terminal device. In another possible implementation, if the computing service requirement further includes a QoS requirement of a computing service flow, the terminal device determines a part of or all of computing service flows that are admitted.

S1003: The terminal device sends first admission information to the RAN device. Correspondingly, the RAN device receives the first admission information from the terminal device. The first admission information indicates the computing service flow or the type of the computing service that is admitted by the terminal device and that is requested by the RAN device.

If the terminal device determines the type of the computing service admitted by the terminal device in operation S1002, the first admission information includes the type of the computing service admitted by the terminal device. Further, the first admission information further includes a resource that can be used by the terminal device to provide the computing service, for example, a GPU/CPU/storage resource. If the terminal device determines the computing service flow that is admitted by the terminal device in operation S1002, the first admission information includes identification information of each of the one or more computing service flows admitted by the terminal device.

S1004: The RAN device determines a target terminal device.

In this operation, the RAN device determines the target terminal device based on the first admission information. This operation is similar to operation S601 in the foregoing embodiment. Details are not described herein again. A main difference is that in this operation, the RAN device determines, based on a QoS requirement of a computing service to be performed by the RAN device, and with reference to the first admission information obtained in operation S1003, one or more terminal devices as target terminal devices, but in the foregoing embodiment, the source RAN device determines, based on the QoS requirement of the computing service to be performed by the source RAN device, and with reference to the RAN device computing capability information of each RAN device obtained by the source RAN device, one or more RAN devices as target RAN devices.

S1005: The RAN device sends second configuration information to the terminal device. Correspondingly, the terminal device receives the second configuration information from the RAN device. The second configuration information is for performing RRC configuration on the terminal device, for example, configuring a running environment of the computing service on the terminal device.

When a plurality of terminal devices may send the first admission information to the RAN device, the terminal device in this operation may be any one of the one or more target terminal devices determined by the RAN device in operation S1004.

S1006: The terminal device exchanges computing service data with the RAN device.

The foregoing operations S1005 and S1006 are respectively similar to operations S905 and S906 in the foregoing embodiment. Details are not described herein again.

It should be noted that, when the RAN device is in a CU-DU split architecture, the operations performed by the RAN device in the foregoing operations in this embodiment are performed by a CU of the RAN device. Further, when the CU includes a CU-CP and a CU-UP, the operations performed by the RAN device in the foregoing operations are performed by the CU-CP of the RAN device. It should be understood that the terminal device interacts with the CU or the CU-CP of the RAN device via a DU of the RAN device.

According to the foregoing operations in this embodiment, a RAN device broadcasts a computing service requirement, and selects an appropriate terminal device from terminal devices that meet the requirement to implement a computing service of the RAN device. This resolves a problem that a source RAN device cannot independently complete a computing service.

When the RAN device uses the terminal device to provide service computing, due to mobility of the terminal device, the terminal device may be handed over from one cell to another cell in a process of providing service computing. Handover of the terminal device may cause interruption of a computing service. To ensure continuity of the computing service, one implementation is transferring an uncompleted computing service in computing services provided by an original terminal device to another terminal device for performing. In another implementation, the computing service is handed over with movement of the terminal device.

Figure 11:
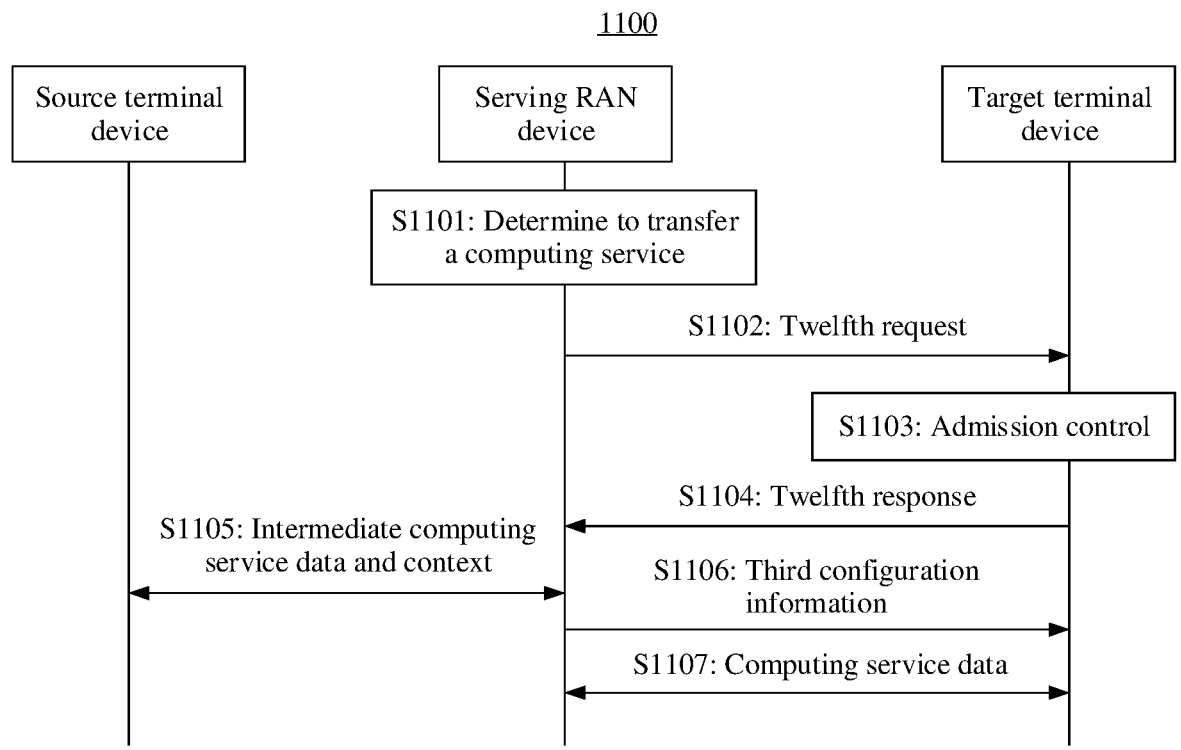
FIG. 11 is a schematic flowchart of a method for transferring a computing service between terminal devices by a RAN device according to an embodiment.

FIG. 11 is a schematic flowchart of a method for transferring a computing service between terminal devices by a RAN device according to an embodiment. The method 1100 is applied to a scenario in which a RAN device transfers a computing service from a terminal device (also referred to as a source terminal device) that currently provides the computing service for the RAN device to another terminal device (also referred to as a target terminal device) served by the RAN device. A procedure in FIG. 11 includes the following operations.

S1101: A serving RAN device determines to transfer a computing service.

Transferring a computing service is transferring uncompleted computing services in computing services performed by a source terminal device to a target terminal device for performing. The computing services performed by the source terminal device may be a part of or all of computing services required by the serving RAN device. In this operation, the serving RAN device determines to transfer the computing service from the source terminal device to the target terminal device for performing. It should be understood that the serving RAN device is a RAN device that provides a communication service for the source terminal device and the target terminal device at a current moment. The source terminal device provides the computing service for the serving RAN device at the current moment. The target terminal device may provide the computing service for the serving RAN device at the current moment or may not provide the computing service for the serving RAN device. In a possible implementation, the serving RAN device determines that the source terminal device is to be handed over to a cell controlled by another RAN device, and the serving RAN device determines to transfer the computing service performed by the source terminal device to the target terminal device. In another possible implementation, the serving RAN device determines, based on load and/or a policy, to transfer the computing service performed by the source terminal device to the target terminal device. In this case, the source terminal device may not be handed over. It should be noted that the target terminal device may be one or more terminal devices. The serving RAN device may transfer a computing service of one source terminal device to one or more target terminal devices for performing.

The serving RAN device determines, based on information about a computing service currently allocated to the source terminal device (for example, a computing service allocated to be performed by the source terminal device and a QoS feature of a performed computing service flow), and with reference to terminal device computing capability information of a plurality of terminal devices obtained by the serving RAN device, one or more terminal devices as target terminal devices. The one or more target terminal devices are configured to undertake the computing service of the current source terminal device. It should be understood that, that the target terminal device undertakes the computing service of the source terminal device means that the target terminal device continues performing computing services that are not completed in computing services performed by the source terminal device. In a possible implementation, each of one or more terminal devices can undertake the computing service provided by the source terminal device. In this case, the serving RAN device determines one terminal device from the one or more terminal devices as the target terminal device. In another possible implementation, no terminal device can independently undertake the computing service provided by the source terminal device. In this case, the serving RAN device determines a plurality of terminal devices as target terminal devices, and a sum of computing capabilities of all terminal devices in the plurality of terminal devices can meet a QoS requirement of the computing service provided by the source terminal device. In still another possible implementation, the serving RAN device may determine a plurality of terminal devices as target terminal devices according to a policy, for example, for consideration of load balancing and fault tolerance performance. A sum of computing capabilities of all terminal devices in the plurality of terminal devices meets or exceeds a QoS requirement of the computing service provided by the source terminal device.

S1102: The serving RAN device sends a twelfth request to the target terminal device. Correspondingly, the target terminal device receives the twelfth request from the serving RAN device. The twelfth request indicates that the serving RAN device requests the target terminal device to undertake all or some computing services of the source terminal device.

S1103: The target terminal device performs admission control on the computing service request.

S1104: The target terminal device sends a twelfth response to the serving RAN device. Correspondingly, the serving RAN device receives the twelfth response from the target terminal device. The twelfth response is a response of the target terminal device to the twelfth request and indicates a computing service flow that is of the source terminal device and that is admitted by the target terminal device.

Steps S1102 to S1104 are respectively similar to operations S602 to S604 in the foregoing embodiment. Details are not described herein again. A main difference is that in this embodiment, the serving RAN device requests the target terminal device to undertake the computing service of the source terminal device, but in the foregoing implementation, the source RAN device requests the target RAN device to perform the computing service of the source RAN device.

S1105: The serving RAN device performs intermediate computing service data and context transfer interaction with the source terminal device.

In this operation, the serving RAN device indicates the source terminal device to end current service computing and obtains intermediate data in a service computing processing process and context information (for example, a service processing status and a progress) of a current computing service.

S1106: The serving RAN device sends third configuration information to the target terminal device. Correspondingly, the target terminal device receives the third configuration information from the serving RAN device. The third configuration information is for performing RRC configuration on the target terminal device, for example, configuring a running environment of the computing service on the target terminal device.

S1107: The serving RAN device exchanges computing service data with the target terminal device.

In this operation, the serving RAN device transmits data of one or more computing service flows to the target terminal device. Optionally, the serving RAN device transmits the context information of the computing service to the target terminal device. It should be understood that the one or more computing service flows are computing service flows that are not completed by the source terminal device. In this case, the target terminal device undertakes the one or more computing service flows. The target terminal device continues performing the one or more computing service flows, generates result data, and sends the result data to the serving RAN device. Optionally, in a process in which the target terminal device performs service computing, the target terminal device and the serving RAN device further exchange intermediate data of the computing service. In other words, before generating the result data, the target terminal device needs to exchange intermediate data in a processing process with the serving RAN device. It should be understood that when there may be a plurality of target terminal devices, this operation is for computing service data exchange between the serving RAN device and each of the plurality of target terminal devices.

It should be noted that, when the serving RAN device is in a CU-DU split architecture, the operations performed by the serving RAN device in the foregoing operations in this embodiment are performed by a CU of the serving RAN device. Further, when the CU includes a CU-CP and a CU-UP, the operations performed by the serving RAN device in the foregoing operations are performed by the CU-CP of the serving RAN device. It should be understood that the source terminal device interacts with the CU or the CU-CP of the serving RAN device via a DU of the serving RAN device that is wirelessly connected to the source terminal device, and the target terminal device interacts with the CU or the CU-CP of the serving RAN device via the DU of the serving RAN device that is wirelessly connected to the target terminal device.

According to the foregoing operations in this embodiment, a RAN device transfers a computing service between terminal devices, to ensure continuity of the computing service.

Figure 12:
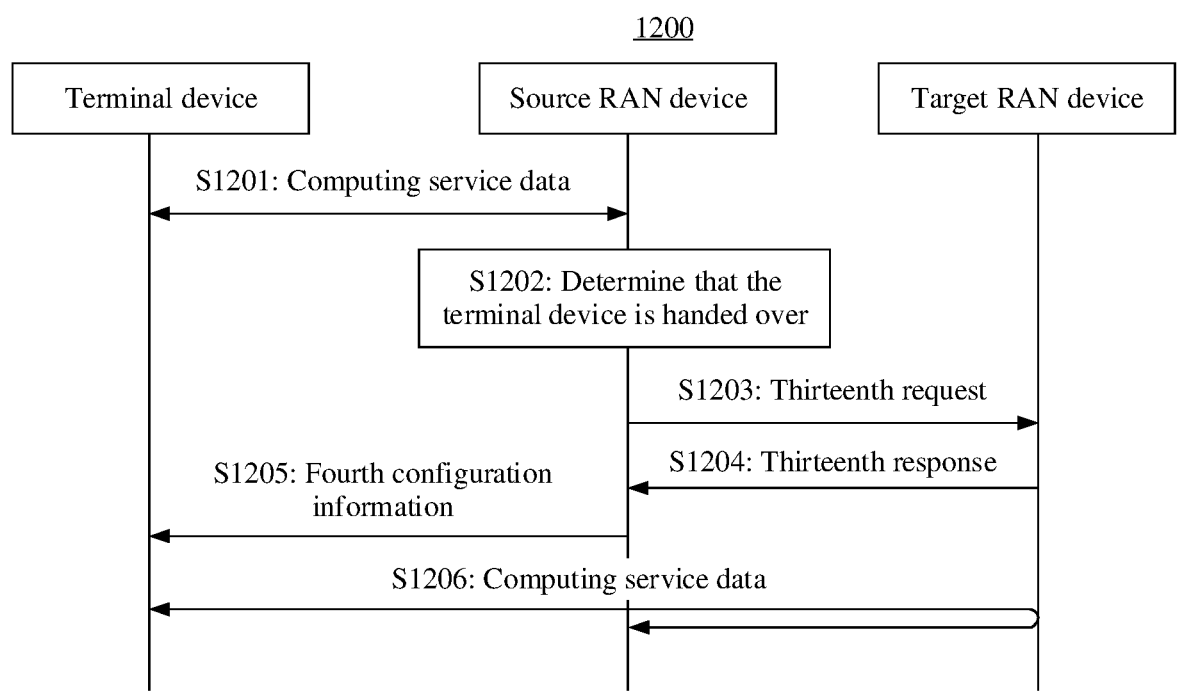
FIG. 12 is a schematic flowchart of a method in which a RAN device hands over a computing service with movement of a terminal device according to an embodiment.

FIG. 12 is a schematic flowchart of a method in which a RAN device hands over a computing service with movement of a terminal device according to an embodiment. The method 1200 is applied to a scenario in which a terminal device that provides a computing service for a serving RAN device is handed over, and the terminal device continues to provide the computing service in a cell after the handover. A procedure in FIG. 12 includes the following operations.

S1201: A terminal device exchanges computing service data with a source RAN device.

In this operation, the terminal device provides a computing service for the source RAN device. The source RAN device may transmit data of one or more computing service flows to the terminal device. The terminal device processes the one or more computing service flows and may exchange intermediate processing data with the source RAN device in the processing process.

S1202: The source RAN device determines that the terminal device is handed over.

In this operation, the source RAN device may determine, in a plurality of manners, that the terminal device is about to be handed over. In a possible implementation, the source RAN device receives a result report of measuring signal strength of a plurality of cells by the terminal device, and determines, based on the report, that the terminal device is to be handed over to a neighboring cell controlled by a target RAN device. In another implementation, the source RAN device determines, according to a load balancing policy, to hand over the terminal device to a neighboring cell controlled by a target RAN device with low load.

S1203: The source RAN device sends a thirteenth request to the target RAN device. Correspondingly, the target RAN device receives the thirteenth request from the source RAN device. The thirteenth request is used by the source RAN device to request the target RAN device to forward the computing service data.

In a possible implementation, the thirteenth request may be one-bit indication information and may indicate that the source RAN device requests the target RAN device to forward the computing service data. In this case, the source RAN device further sends transport layer information of the source RAN device to the target RAN device. The transport layer information is for exchanging data with the target RAN device. In another possible implementation, the thirteenth request may be a message. The message indicates that the source RAN device requests the target RAN device to forward the computing service data. In this case, the thirteenth request further includes the transport layer information of the source RAN device.

S1204: The target RAN device sends a thirteenth response to the source RAN device. Correspondingly, the source RAN device receives the thirteenth response from the target RAN device. The thirteenth response is a response of the target RAN device to the thirteenth request. The thirteenth response indicates that the target RAN device accepts the thirteenth request.

The thirteenth response includes transport layer information of the target RAN device. The transport layer information is for exchanging data with the source RAN device. In addition, the thirteenth response further includes configuration information used by the target RAN device to exchange the computing service data with the terminal device, for example, DRB configuration.

S1205: The source RAN device sends fourth configuration information to the terminal device. Correspondingly, the terminal device receives the fourth configuration information from the source RAN device. The fourth configuration information is used by the source RAN device to forward, to the terminal device, the configuration information received by the source RAN device in the thirteenth response.

S1206: The terminal device exchanges the computing service data with the source RAN device via the target RAN device.

After receiving the fourth configuration information, the terminal device performs random access to access the target RAN device, to complete terminal device handover. After the terminal device handover is completed, the target RAN device provides a service for the terminal device.

A computing service that is not completed by the terminal device before the handover is continued by the terminal device after the handover. In a possible implementation, in a process in which the terminal device performs the computing service after the handover, the terminal device still needs to exchange intermediate data of the computing service with the source RAN device. In this case, the terminal device exchanges the intermediate data with the target RAN device through an air interface, and the target RAN device forwards the intermediate data by communicating with the source RAN device, to implement data exchange between the terminal device and the source RAN device. In another possible implementation, in a process in which the terminal device performs the computing service after the handover, the terminal device does not need to exchange intermediate data of the computing service with the source RAN device. In this case, if the terminal device completes the computing service in a target cell, the terminal device sends result data of the computing service to the source RAN device via the target RAN device. In still another possible implementation, if the terminal device does not complete the computing service in a target cell but is to be handed over again to a cell controlled by another RAN device, the terminal device may exchange, via the target RAN device, intermediate data of a computing service currently completed by the terminal device with the source RAN device before the handover.

It should be noted that, when the source RAN device is in a CU-DU split architecture, the operations performed by the source RAN device in the foregoing operations in this embodiment are performed by a CU of the source RAN device. Further, when the CU includes a CU-CP and a CU-UP, the operations performed by the source RAN device in the foregoing operations are performed by the CU-CP of the source RAN device. It should be understood that the terminal device interacts with the CU or the CU-CP of the source RAN device via a DU of the source RAN device that is wirelessly connected to the terminal device. When the target RAN device is in a CU-DU split architecture, the operations performed by the target RAN device in the foregoing operations in this embodiment are performed by a CU of the target RAN device. Further, when the CU includes a CU-CP and a CU-UP, the operations performed by the target RAN device in the foregoing operations are performed by the CU-CP of the target RAN device. It should be understood that the terminal device interacts with the CU or the CU-CP of the target RAN device via a DU of the target RAN device that is wirelessly connected to the terminal device.

According to the foregoing operations in this embodiment, a terminal device continues performing an original computing service after handover, to ensure continuity of the computing service.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a non-transitory computer-readable storage medium to another non-transitory computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like. A person skilled in the art may use different methods to implement the described functions for each particular application, but it should not be considered that the implementation goes beyond the scope of the embodiments.

The foregoing describes in detail the method embodiments with reference to FIG. 3 to FIG. 12. The following describes in detail the apparatus embodiments with reference to FIG. 13 to FIG. 18. It should be understood that the apparatus embodiments and the method embodiments correspond to each other, and for similar descriptions, refer to the method embodiments. It should be noted that, the apparatus embodiments may be used in cooperation with the foregoing methods or may be separately used.

Figure 13:
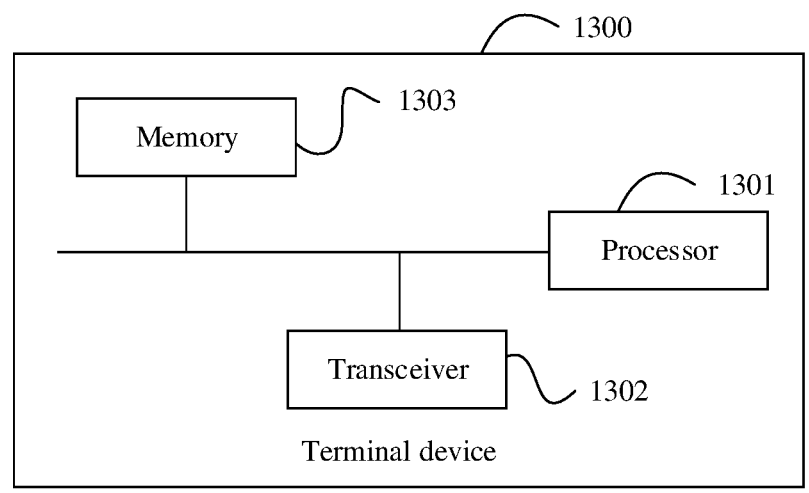
FIG. 13 is a schematic block diagram of a terminal device according to an embodiment.

FIG. 13 is a schematic block diagram of a terminal device 1300 according to an embodiment. The terminal device 1300 may correspond to (for example, may be configured as or may be) the terminal device described in the method 400, the terminal device described in the method 500, the target terminal device described in the method 900, the terminal device described in the method 1000, the source terminal device described in the method 1100, the target terminal device described in the method 1100, the terminal device described in the method 1200, or a terminal device described in another implementation. The terminal device 1300 may include a processor 1301 and a transceiver 1302. The processor 1301 and the transceiver 1302 are communicatively coupled. Optionally, the terminal device 1300 further includes a memory 1303. The memory 1303 is communicatively coupled to the processor 1301. Optionally, the processor 1301, the memory 1303, and the transceiver 1302 may be communicatively coupled. The memory 1303 may be configured to store instructions. The processor 1301 is configured to execute the instructions stored in the memory 1303, to control the transceiver 1302 to receive and/or send information or a signal. The processor 1301 and the transceiver 1302 are separately configured to perform actions or processing processes performed by the terminal device described in the method 400, the terminal device described in the method 500, the target terminal device described in the method 900, the terminal device described in the method 1000, the source terminal device described in the method 1100, the target terminal device described in the method 1100, the terminal device described in the method 1200, or a terminal device described in another implementation. Herein, to avoid repetition, detailed descriptions are omitted. When the terminal device 1300 is in a CU-DU split architecture, the terminal device 1300 shown in FIG. 13 may be a CU or a CU-CP.

Figure 14:
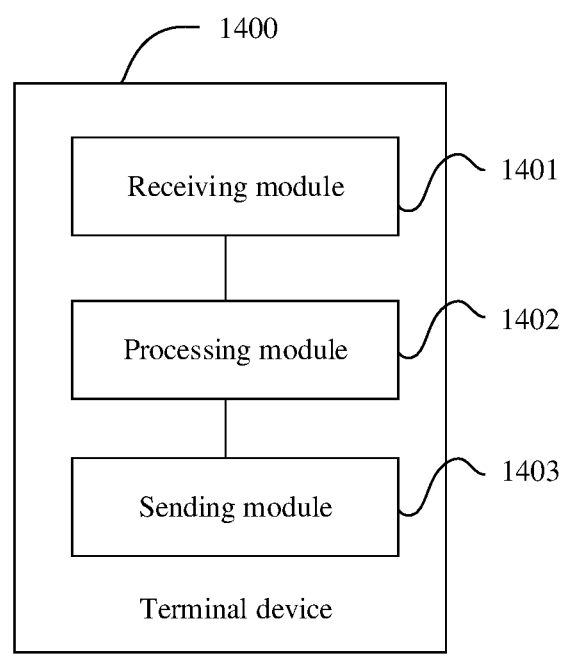
FIG. 14 is another schematic block diagram of a terminal device according to an embodiment.

FIG. 14 is another schematic block diagram of a terminal device 1400 according to an embodiment. The terminal device 1400 may correspond to (for example, may be configured as or may be) the terminal device described in the method 400, the terminal device described in the method 500, the target terminal device described in the method 900, the terminal device described in the method 1000, the source terminal device described in the method 1100, the target terminal device described in the method 1100, the terminal device described in the method 1200, or a terminal device described in another implementation. The terminal device 1400 may include a receiving module 1401, a processing module 1402, and a sending module 1403. The processing module 1402 is separately communicatively coupled to the receiving module 1401 and the sending module 1403. The terminal device 1400 may be in a form shown in FIG. 13. The processing module 1402 may be implemented by using the processor 1301 in FIG. 13, and the receiving module 1401 and/or the sending module 1403 may be implemented by using the transceiver 1302 in FIG. 13. The terminal device 1400 may further include a storage unit, configured to store a program or data to be executed by the processing module 1402, or store information received by the receiving module 1401 and/or information sent by the sending module 1403. Modules or units in the terminal device 1400 are separately configured to perform actions or processing processes performed by the terminal device described in the method 400, the terminal device described in the method 500, the target terminal device described in the method 900, the terminal device described in the method 1000, the source terminal device described in the method 1100, the target terminal device described in the method 1100, the terminal device described in the method 1200, or a terminal device described in another implementation. Herein, to avoid repetition, detailed descriptions are omitted. When the terminal device 1400 is in a CU-DU split architecture, the terminal device 1400 shown in FIG. 14 may be a CU or a CU-CP.

Figure 15:
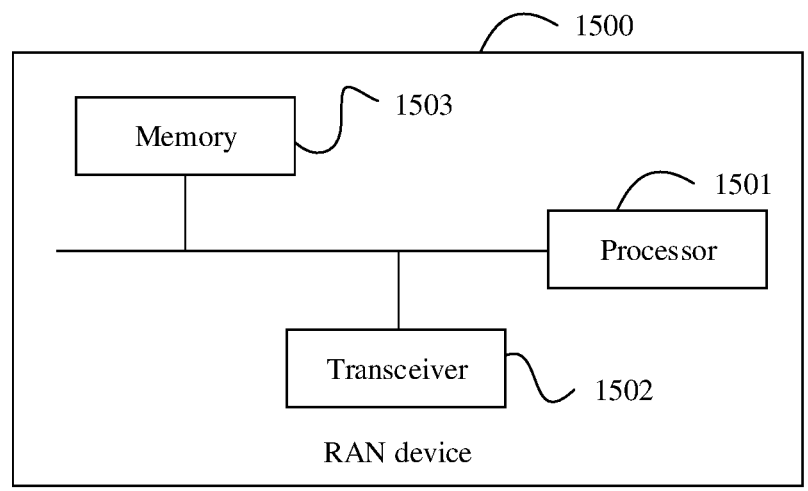
FIG. 15 is a schematic block diagram of a RAN device according to an embodiment.

FIG. 15 is a schematic block diagram of a RAN device 1500 according to an embodiment. The RAN device 1500 may correspond to (for example, may be configured as or may be) the first RAN device described in the method 300, the second RAN device described in the method 300, the first RAN device described in the method 400, the second RAN device described in the method 400, the first RAN device described in the method 500, the source RAN device described in the method 600, the target RAN device described in the method 600, the source RAN device described in the method 700, the target RAN device described in the method 700, the target RAN device described in the method 800, the RAN device described in the method 900, the RAN device described in the method 1000, the serving RAN device described in the method 1100, the source RAN device described in the method 1200, the target RAN device described in the method 1200, or a RAN device described in another implementation. The RAN device 1500 may include a processor 1501 and a transceiver 1502. The processor 1501 and the transceiver 1502 are communicatively coupled. Optionally, the RAN device 1500 further includes a memory 1503. The memory 1503 is communicatively coupled to the processor 1501. Optionally, the processor 1501, the memory 1503, and the transceiver 1502 may be communicatively coupled. The memory 1503 may be configured to store instructions. The processor 1501 is configured to execute the instructions stored in the memory 1503, to control the transceiver 1502 to receive and/or send information or a signal. The processor 1501 and the transceiver 1502 are separately configured to perform actions or processing processes performed by the first RAN device described in the method 300, the second RAN device described in the method 300, the first RAN device described in the method 400, the second RAN device described in the method 400, the first RAN device described in the method 500, the source RAN device described in the method 600, the target RAN device described in the method 600, the source RAN device described in the method 700, the target RAN device described in the method 700, the target RAN device described in the method 800, the RAN device described in the method 900, the RAN device described in the method 1000, the serving RAN device described in the method 1100, the source RAN device described in the method 1200, the target RAN device described in the method 1200, or a RAN device described in another implementation. Herein, to avoid repetition, detailed descriptions are omitted. When the RAN device 1500 is in a CU-DU split architecture, the RAN device 1500 shown in FIG. 15 may be a CU or a CU-CP.

Figure 16:
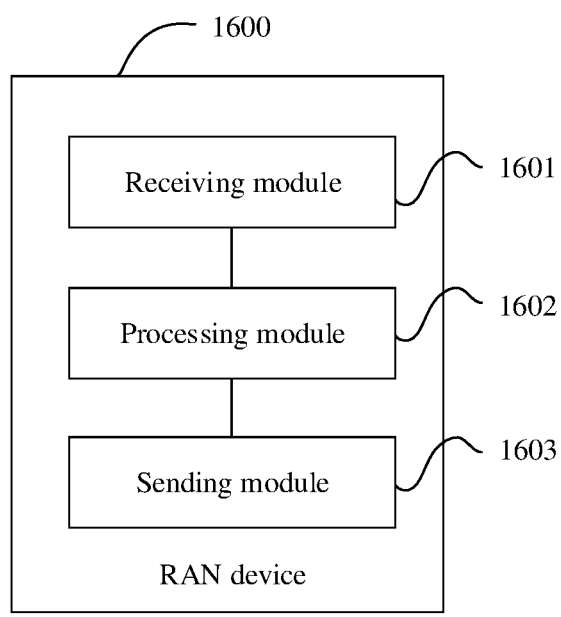
FIG. 16 is another schematic block diagram of a RAN device according to an embodiment.

FIG. 16 is another schematic block diagram of a RAN device 1600 according to an embodiment. The RAN device 1600 may correspond to (for example, may be configured as or may be) the first RAN device described in the method 300, the second RAN device described in the method 300, the first RAN device described in the method 400, the second RAN device described in the method 400, the first RAN device described in the method 500, the source RAN device described in the method 600, the target RAN device described in the method 600, the source RAN device described in the method 700, the target RAN device described in the method 700, the target RAN device described in the method 800, the RAN device described in the method 900, the RAN device described in the method 1000, the serving RAN device described in the method 1100, the source RAN device described in the method 1200, the target RAN device described in the method 1200, or a RAN device described in another implementation. The RAN device 1600 may include a receiving module 1601, a processing module 1602, and a sending module 1603. The processing module 1602 is separately communicatively coupled to the receiving module 1601 and the sending module 1603. The RAN device 1600 may be in a form shown in FIG. 15. The processing module 1602 may be implemented by using the processor 1501 in FIG. 15, and the receiving module 1601 and/or the sending module 1603 may be implemented by using the transceiver 1502 in FIG. 15. The RAN device 1600 may further include a storage unit, configured to store a program or data to be executed by the processing module 1602, or store information received by the receiving module 1601 and/or information sent by the sending module 1603. Modules or units in the RAN device 1600 are separately configured to perform actions or processing processes performed by the first RAN device described in the method 300, the second RAN device described in the method 300, the first RAN device described in the method 400, the second RAN device described in the method 400, the first RAN device described in the method 500, the source RAN device described in the method 600, the target RAN device described in the method 600, the source RAN device described in the method 700, the target RAN device described in the method 700, the target RAN device described in the method 800, the RAN device described in the method 900, the RAN device described in the method 1000, the serving RAN device described in the method 1100, the source RAN device described in the method 1200, the target RAN device described in the method 1200, or a RAN device described in another implementation. Herein, to avoid repetition, detailed descriptions are omitted. When the RAN device 1600 is in a CU-DU split architecture, the RAN device 1600 shown in FIG. 16 may be a CU or a CU-CP.

Figure 17:
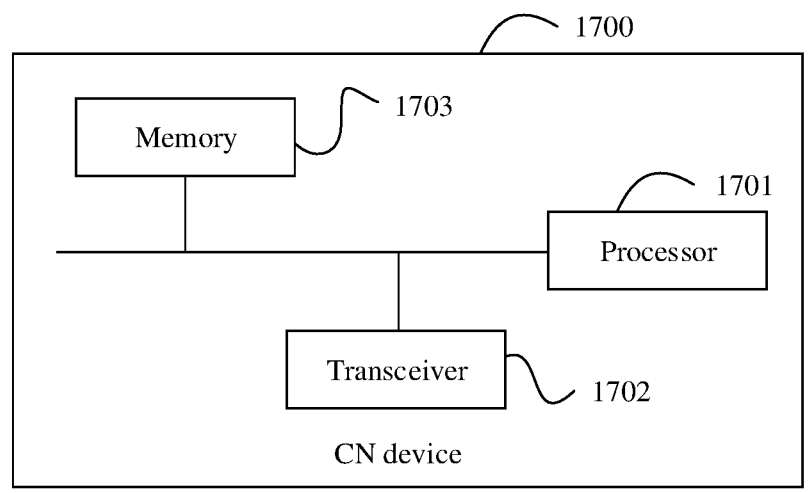
FIG. 17 is a schematic block diagram of a CN device according to an embodiment.

FIG. 17 is a schematic block diagram of a CN device 1700 according to an embodiment. The CN device 1700 may correspond to (for example, may be configured as or may be) the CN device described in the method 300, the CN device described in the method 400, the first CN device described in the method 500, the second CN device described in the method 700, the source CN device described in the method 800, the CCF described in the method 800, the target CN device described in the method 800, or a CN device described in another implementation. The CN device 1700 may include a processor 1701 and a transceiver 1702. The processor 1701 and the transceiver 1702 are communicatively coupled. Optionally, the CN device 1700 further includes a memory 1703. The memory 1703 is communicatively coupled to the processor 1701. Optionally, the processor 1701, the memory 1703, and the transceiver 1702 may be communicatively coupled. The memory 1703 may be configured to store instructions. The processor 1701 is configured to execute the instructions stored in the memory 1703, to control the transceiver 1702 to receive and/or send information or a signal. The processor 1701 and the transceiver 1702 are separately configured to perform actions or processing processes performed by the CN device described in the method 300, the CN device described in the method 400, the first CN device described in the method 500, the second CN device described in the method 700, the source CN device described in the method 800, the CCF described in the method 800, the target CN device described in the method 800, or a CN device described in another implementation. Herein, to avoid repetition, detailed descriptions are omitted. When the CN device 1700 is in a CU-DU split architecture, the CN device 1700 shown in FIG. 17 may be a CU or a CU-CP.

Figure 18:
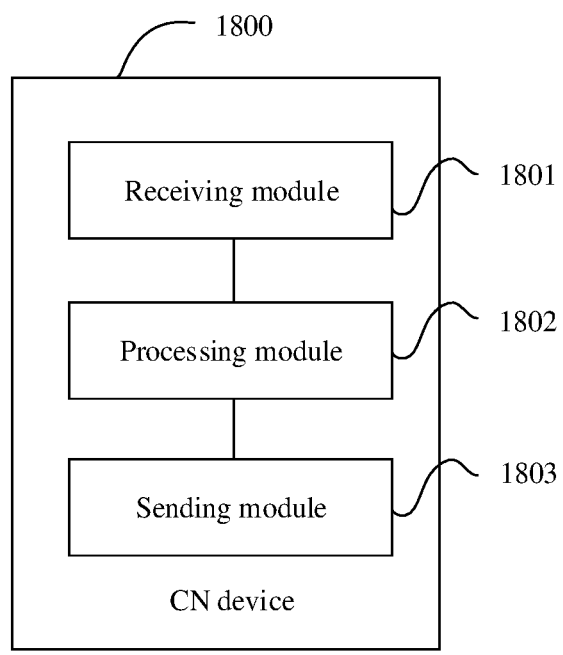
FIG. 18 is another schematic block diagram of a CN device according to an embodiment.

FIG. 18 is another schematic block diagram of a CN device 1800 according to an embodiment. The CN device 1800 may correspond to (for example, may be configured as or may be) the CN device described in the method 300, the CN device described in the method 400, the first CN device described in the method 500, the second CN device described in the method 700, the source CN device described in the method 800, the CCF described in the method 800, the target CN device described in the method 800, or a CN device described in another implementation. The CN device 1800 may include a receiving module 1801, a processing module 1802, and a sending module 1803. The processing module 1802 is separately communicatively coupled to the receiving module 1801 and the sending module 1803. The CN device 1800 may be in a form shown in FIG. 17. The processing module 1802 may be implemented by using the processor 1701 in FIG. 17, and the receiving module 1801 and/or the sending module 1803 may be implemented by using the transceiver 1702 in FIG. 17. The CN device 1800 may further include a storage unit, configured to store a program or data to be executed by the processing module 1802, or store information received by the receiving module 1801 and/or information sent by the sending module 1803. Modules or units in the CN device 1800 are separately configured to perform actions or processing processes performed by the CN device described in the method 300, the CN device described in the method 400, the first CN device described in the method 500, the second CN device described in the method 700, the source CN device described in the method 800, the CCF described in the method 800, the target CN device described in the method 800, or a CN device described in another implementation. Herein, to avoid repetition, detailed descriptions are omitted. When the CN device 1800 is in a CU-DU split architecture, the CN device 1800 shown in FIG. 18 may be a CU or a CU-CP.

It should be understood that the processor (1301, 1501, or 1701) in the apparatus embodiments may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory (1303, 1503, or 1703) in the apparatus embodiments may be a volatile memory, for example, a random access memory (RAM); or may be a non-volatile memory, for example, a read-only memory (ROM), a flash memory, a hard disk drive (HDD), or a solid-state drive (SSD); or may be a combination of the foregoing types of memories.

In the several embodiments, it should be understood that the apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication couplings may be implemented through some interfaces. The indirect couplings or communication couplings between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, function units in the embodiments may be integrated into one processing unit, or each of the units may exist alone physically, or two or more units may be integrated into one unit.

When functions are implemented in a form of a software functional unit and sold or used as an independent product, the functions may be stored in a non-transitory computer-readable storage medium. Based on such an understanding, the embodiments may be implemented in a form of a software product. The computer software product is stored in a non-transitory storage medium and includes several instructions for instructing a computer device (which may be a personal computer, a server, a network device, or the like) to perform all or some of the operations of the methods described in the embodiments. The foregoing storage medium includes any non-transitory medium that can store program code, for example, a USB flash drive, a removable hard disk, a read-only memory (ROM), a random access memory (RAM), a magnetic disk, or an optical disc.

The foregoing descriptions are merely implementations, but are not intended to limit the scope of the embodiments. Any variation or replacement readily figured out by a person skilled in the art shall fall within the scope of the embodiments.

What is claimed is:

1. A computing service implementation method, comprising:
    obtaining, by a first radio access network (RAN) device, computing capability information of a first communication device;
    sending, by the first RAN device, a first request to the first communication device, wherein the first request is for requesting the first communication device to perform a computing service of the first RAN device;
    receiving, by the first RAN device, a first response from the first communication device, wherein the first response indicates the computing service from the first RAN device and that is admitted by the first communication device; and
    exchanging, by the first RAN device with the first communication device, data of the computing service from the first RAN device and that is admitted by the first communication device.

2. The computing service implementation method according to claim 1, wherein the computing capability information of the first communication device comprises a type of a computing service supported by the first communication device and available resource information.

3. The computing service implementation method according to claim 1, wherein
the first request comprises a quality of service (QoS) requirement of the computing service of the first RAN device; and
the first response comprises at least one computing service flow from the first RAN device and that is admitted by the first communication device.

4. The computing service implementation method according to claim 1, wherein the obtaining, by a first RAN device, computing capability information of a first communication device comprises:
receiving, by the first RAN device, the computing capability information of the first communication device from the first communication device, and sending, by the first RAN device, acknowledgment information to the first communication device, wherein the acknowledgment information indicates that the first RAN device correctly receives the computing capability information of the first communication device; or
receiving, by the first RAN device, the computing capability information of the first communication device from a second communication device, and sending, by the first RAN device, acknowledgment information to the second communication device, wherein the acknowledgment information indicates that the first RAN device correctly receives the computing capability information of the first communication device.

5. The computing service implementation method according to claim 1, wherein
the first communication device is a second RAN device, and the second communication device is a core network (CN) device; or
the first communication device is a terminal device, and the second communication device is a second RAN device or a CN device.

6. The computing service implementation method according to claim 1, wherein the sending, by the first RAN device, a first request to the first communication device comprises:
when the first communication device is the second RAN device or the terminal device, determining, by the first RAN device based on the computing capability information of the first communication device, that the first communication device is a target communication device, and sending, by the first RAN device, the first request to the target communication device; or
when the first communication device is the second RAN device and the second communication device is the CN device, determining, by the first RAN device based on the computing capability information of the first communication device, that the first communication device is a target communication device, and sending, by the first RAN device, the first request to the target communication device via the second communication device.

7. A communication device, used in a first radio access network (RAN) device, comprising:
a transceiver;
at least one processor; and
one or more memories coupled to the at least one processor and storing programming instructions, when executed by the at least one processor, cause the apparatus to:
obtain computing capability information of a first communication device;

send a first request to the first communication device, wherein the first request is for requesting the first communication device to perform a computing service of the first RAN device; and
receive a first response from the first communication device, wherein the first response indicates the computing service from the first RAN device and that is admitted by the first communication device, wherein
the programming instructions further cause the communications apparatus to exchange, with the first communication device, data of the computing service from the first RAN device and that is admitted by the first communication device.

8. The communication device according to claim 7, wherein the computing capability information of the first communication device comprises a type of a computing service supported by the first communication device and available resource information.

9. The communication device according to claim 7, wherein
the first request comprises a quality of service (QoS) requirement of the computing service of the first RAN device; and
the first response comprises at least one computing service flow from the first RAN device and that is admitted by the first communication device.

10. The communication device according to claim 7, wherein the programming instructions further cause the communications apparatus to:
receive the computing capability information of the first communication device from the first communication device, and sending, by the sending module, acknowledgment information to the first communication device, wherein the acknowledgment information indicates that the first RAN device correctly receives the computing capability information of the first communication device; or
receive the computing capability information of the first communication device from a second communication device, and sending, by the sending module, acknowledgment information to the second communication device, wherein the acknowledgment information indicates that the first RAN device correctly receives the computing capability information of the first communication device.

11. The communication device according to claim 7, wherein
the first communication device is a second RAN device, and the second communication device is a core network (CN) device; or
the first communication device is a terminal device, and the second communication device is a second RAN device or a CN device.

12. The communication device according to claim 7, wherein the programming instructions further cause the communications apparatus to:
when the first communication device is the second RAN device or the terminal device, determine, based on the computing capability information of the first communication device, that the first communication device is a target communication device, and send the first request to the target communication device; or
when the first communication device is the second RAN device and the second communication device is the CN device, determine, based on the computing capability information of the first communication device, that the first communication device is a target communication device, and send the first request to the target communication device via the second communication device.

13. A communication device, used in a first communication device comprising:
    a transceiver;
    at least one processor; and
    one or more memories coupled to the at least one processor and storing programming instructions, when executed by the at least one processor, cause the communications apparatus to:
      receive a first request from a second communication device, wherein the first request is for requesting the first communication device to perform a computing service of a first radio access network (RAN) device;
      send a first response to the second communication device, wherein the first response indicates the computing service from the first RAN device and that is admitted by the first communication device; and
      exchange, with the first RAN device, data of the computing service from the first RAN device and that is admitted by the first communication device.

14. The communication device according to claim 13, wherein the programming instructions further cause the communications apparatus to generate computing capability information of the first communication device; and
    send the computing capability information of the first communication device to the second communication device.

15. The communication device according to claim 14, wherein the computing capability information of the first communication device comprises a type of a computing service supported by the first communication device and available resource information.

16. The communication device according to claim 13, wherein
    the first request comprises a quality of service (QoS) requirement of the computing service of the first RAN device; and
    the first response comprises at least one computing service flow from the first RAN device and that is admitted by the first communication device.

17. The communication device according to claim 13, wherein the programming instructions further cause the communications apparatus to perform admission control, wherein the admission control is for determining the computing service from the first RAN device and that is admitted by the first communication device.

18. The communication device according to claim 13, wherein
    the first communication device is a second RAN device, and the second communication device is the first RAN device or a core network (CN) device; or
    the first communication device is a terminal device, and the second communication device is the first RAN device.

19. The communication device according to claim 13, wherein when the first communication device is the second RAN device and the second communication device is the first RAN device or the CN device, the programming instructions further cause the communications apparatus to:
    generate computing capability information of the second RAN device; and
    send the computing capability information of the second RAN device to the second communication device.

20. The communication device according to claim 13, wherein when the first communication device is the terminal device and the second communication device is the first RAN device, the programming instructions further cause the communications apparatus to:
    generate computing capability information of the terminal device, and
    send the computing capability information of the terminal device to the first RAN device; or
    generate computing capability information of the terminal device, and send the computing capability information of the terminal device to the first RAN device via the CN device.

* * * * *